United States Patent [19]
Shirakihara et al.

[11] Patent Number: 5,941,956
[45] Date of Patent: Aug. 24, 1999

[54] NETWORK SYSTEM SUPPORTING NETWORK COMMUNICATION AMONG TEMPORARILY CONNECTED MOBILE COMPUTERS AND FLEXIBLE FILE SHARING AMONG COMPUTERS

[75] Inventors: Toshio Shirakihara, Kanagawa-ken; Hiroshi Esaki, Fukuoka-ken, both of Japan

[73] Assignee: Kabushiki Kaisha Toshiba, Kawasaki, Japan

[21] Appl. No.: 08/477,350

[22] Filed: Jun. 7, 1995

[30]    Foreign Application Priority Data

Aug. 30, 1994  [JP]  Japan ................................ 6-204746

[51] Int. Cl.⁶ ........................................... G06F 13/00
[52] U.S. Cl. .......................... 709/245; 709/228; 709/200
[58] Field of Search ..................... 340/825.03, 825.06, 340/825.07, 825.5, 825.51, 825.52, 825.53, 825.69, 825.72; 359/164, 115; 370/92, 93, 259, 257, 453; 348/25.34; 395/200.12, 200.06, 200.2, 200.75, 200.58; 455/33.1, 33.2, 89

[56]            References Cited

U.S. PATENT DOCUMENTS

| | | | |
|---|---|---|---|
| 4,689,786 | 8/1987 | Sidhu et al. ............................... | 370/94 |
| 4,730,251 | 3/1988 | Aakre et al. .............................. | 364/200 |
| 5,179,554 | 1/1993 | Lomicka et al. ...................... | 370/85.13 |
| 5,185,860 | 2/1993 | Wu .......................................... | 395/200 |
| 5,301,273 | 4/1994 | Konishi ................................... | 395/200 |
| 5,410,543 | 4/1995 | Seitz et al. ............................ | 370/85.13 |
| 5,465,330 | 11/1995 | Komatsu et al. ........................ | 395/824 |
| 5,502,818 | 3/1996 | Lamberg ............................. | 395/200.16 |
| 5,517,618 | 5/1996 | Wada et al. ......................... | 395/200.15 |
| 5,584,022 | 12/1996 | Kikuchi et al. .......................... | 395/609 |
| 5,598,536 | 1/1997 | Slaughter, III et al. ........... | 395/200.16 |

OTHER PUBLICATIONS

F. Teraoka et al., "Design Implementation, and Evaluation of Virtual Internet Protocol", Protocol of the 12th International Conference on Distributed Computing System, pp. 170–177 Jun., 1992.

Network Working Group: "Dynamic Host Configuration Protocol", RFC (Request for comments) pp. 1–39, Oct., 1993.

*Primary Examiner*—Ayaz R. Sheikh
*Assistant Examiner*—Jigar Pancholi
*Attorney, Agent, or Firm*—Foley & Lardner

[57]            ABSTRACT

A network system, in which a plurality of computers are connected to a network at a plurality of connectors, and a plurality of address conversion devices are provided in correspondence to the connectors. In each address conversion device, a fixed address on the network corresponding to each address conversion device is stored, while a computer address of one computer connected at one connector corresponding to each address conversion device is acquired and stored. Then, a source address contained in a message transmitted from that one computer to the network given in terms of the computer address is converted into the stored fixed address, while a destination address contained in a message transmitted from the network to that one computer given in terms of the fixed address is converted into the stored computer address.

34 Claims, 17 Drawing Sheets

| PHYSICAL LOCATION ID | FIXED ADDRESS |
|---|---|
| 1 | A1 |
| 2 | A2 |
| 3 | A3 |
|  |  |
|  |  |

VISIBLE/HIDDEN FILE

| FILE F1 | host1, host2, usr1, usr3 |
|---|---|
| FILE F2 | host2, usr2 |
| FILE F3 | host3, usr1 |
| DIRECTOR D2 | host1, usr3 |

NETWORK SYSTEM SUPPORTING NETWORK COMMUNICATION AMONG TEMPORARILY CONNECTED MOBILE COMPUTERS AND FLEXIBLE FILE SHARING AMONG COMPUTERS

BACKGROUND OF THE INVENTION

1. Field of the Invention

The present invention relates to a network system supporting network communication among mobile computers through a temporarily formed network and file sharing among computers.

2. Description of the Background Art

Conventionally, a file sharing scheme for sharing files among a plurality of computers has been realized in a form of a distributed file system, etc. by forming a distributed system in which the computers are connected through a network. In a case where a plurality of mobile computers participate in such a network and share data among these mobile computers, the following procedure is necessary.

(1) Connection of each mobile computer to the network (2) Authentication of each mobile computer/user on the network (3) Disclosure of files with respect to the other users In the following, the conventional method and its problems for each of these steps (1) to (3) in the above procedure will be described.

(1) Connection of each mobile computer to the network

The most typical computer network is the so called home network for connecting fixed computers, in which a logical address is allocated to each computer and an address table registering a correspondence between a physical address of each computer and an allocated logical address is formed. In such a home network, the procedure for a certain user U1 on a computer M1 to communicate with another computer M2 is as follows.

(a) The user U1 specifies a logical address IP2 of the computer M2.

(b) The operating system (OS) of the computer M1 checks the physical address E2 corresponding to the logical address IP2 from the address table, and transmits messages through the network by specifying the physical address E2.

In the step (a) of this procedure, means for obtaining a logical address of a host from a host name is often provided, and in such a case, the user U1 can make the communication by specifying the host name of the computer M2.

Now, it is preferable for the mobile computer such as a portable computer terminal to be capable of being connected to a temporal network which is a network other than the home network to which it normally belongs. As an exemplary conventional scheme for realizing such a connection, there is a protocol called VIP as disclosed in Fumio Teraoka, Kim Claffy, and Mario Tokoro: "Design, Implementation, and Evaluation of Virtual Internet Protocol", Proc. of the 12th International Conference on Distributed Computing System, June 1992.

This VIP is a protocol for supporting a mobile computer on the internet, in which the mobile computer has an IP address corresponding to the conventional logical address, and a VIP address as a host identifier independent of the network to which it belongs, such that the migration transparency of the computer is realized by using the VIP address as the logical address. By means of this protocol, the mobile computer itself can be set in a state similar to a case in which it is on the home network, but it is impossible to carry out the collaborative work such as a sharing of files with the other computers on the temporal network.

Also, as another conventional scheme for realizing a connection to the temporal network, there is a scheme using a protocol called DHCP as disclosed in Network Working Group: "Dynamic Host Configuration Protocol", RFC (Request for comments) 1531, October, 1993. According to DHCP, it is possible to dynamically change the network setting of the connected computer at a time of connection, so that the connected computer can operate as a computer on the temporal network. However, there is a drawback that the setting of the computer is going to be changed every time it is connected to a different temporal network. In addition, this DHCP itself only provides an information necessary for connecting the computer to the network, so that in order to actually connect the computer, there is a need to provide a software for changing the setting of the computer according to the network information obtained from the DHCP.

Also, in the field of the internet, there has been a proposition for an address switching IP router which switches an address of a message at a portion called router for connecting two networks. In view of this, it is possible to consider a scheme in which a plurality of address switching IP routers are provided on the temporal network and each mobile computer is connected to the temporal network through one of these address switching IP routers. However, as this address switching IP router carries out the address switching by looking up a statically defined address table, there is a drawback that it is necessary to change this static address table every time each mobile computer is to be connected to the temporal network.

(2) Authentication of each mobile computer/user on the network

Most of the conventional distributed file systems realize the file sharing by using a user authentication function and a host identification function provided by a name service on the network. For example, in the NFS (Network File System), the function provided by the NIS (Network Information Service) is used for the identification of the user and the host. This NIS manages the information such as a host table (host name, IP address), a net group (net group name, host name), a user table (user name+pass word, user ID+group ID), and carries out the authentication at a time of the user log in by using the user name and the pass word.

On the other hand, in the distributed file system, the disclosure of files subordinate to a certain directory is carried out by specifying host names or net group names to which the files are to be disclosed such that only the permitted hosts can use the disclosed data. Also, the access right is set up for each file such that an access to each file by a certain user is possible only when such an access is judged to be permitted to that certain user by checking the user ID/group ID of that certain user.

There has also been a method for carrying out the authentication of the host and the user without using the network name service, by managing the host table, the net group, and the user table at each computer. In this case, each management information is recorded as a file possessed by each computer.

In such a manner, the conventional distributed file system realizes the file sharing among computers, but this is realized with respect to a network formed by fixed computers such as a home network, and it is necessary to allocate an address to a computer temporarily connected to the network by means of the DHCP, etc. Here, however, the allocated address is a dynamically allocated one, so that the authentication of each computer cannot be carried out, and there is no means for determining which data are to be disclosed.

(3) Disclosure of files with respect to the other users

In addition, in a case of disclosing the files subordinate to a certain directory (referred hereafter as a disclosure root directory) with respect to the users so as to share these files with the other users, these files become accessible for the other users as the other users mount that disclosure root directory. Here, the disclosure root directory has some other directories (referred hereafter as disclosure sub-directories) and some files subordinate to it, so that it becomes possible for the other users to know their existence. As for the files, they are accessible when the access rights are given. Also, if an access right is given to the disclosure sub-directory, it is possible for the other users to know the existence of the files and directories subordinate to that disclosure sub-directory.

Now, in a case of setting up a certain disclosure directory on the dynamically generated network such as the temporal network, it is preferable to be able to hide the existence of particular files subordinate to that disclosure directory. However, in a conventional distributed file system, when the files subordinate to a certain directory are disclosed, the existence of all the files subordinate to that certain directory is going to be disclosed, and the existence of the files subordinate to the disclosure sub-directories to which the accesses are permitted is also going to be disclosed.

SUMMARY OF THE INVENTION

It is therefore an object of the present invention to provide a network system with a network communication scheme capable of connecting the mobile computer to the temporal network without requiring a new software on the mobile computer and without changing the setting of the mobile computer.

It is another object of the present invention to provide a network system with a network communication scheme that can be utilized as an authentication function at a time of disclosing the data, which is capable of realizing a communication by recognizing a physical location of a mobile computer of each participant in a conference.

It is another object of the present invention to provide a network system with a file sharing scheme capable of disclosing different directory structures for different users or computers at a time of disclosing files to the other computers, even when the disclosure requests with respect to the same directory are made by the different users or computers.

According to one aspect of the present invention there is provided a network system, comprising: a network; connector means for connecting a computer to the network; fixed address storage means for storing a fixed address on the network corresponding to the connector means; computer address acquisition and storage means for acquiring and storing a computer address of the computer connected at the connector means; and means for converting an address contained in a message for a communication between the computer and the network according to one of the fixed address stored in the fixed address storage means and the computer address stored in the computer address acquisition and storage means.

According to another aspect of the present invention there is provided a network system, comprising: a network; a plurality of connector means for connecting a plurality of computers to the network; a plurality of address conversion devices provided in correspondence to the connector means, each address conversion device including: fixed address storage means for storing a fixed address on the network corresponding to said each address conversion device; computer address acquisition and storage means for acquiring and storing a computer address of one computer connected at one connector means corresponding to said each address conversion device; and conversion means for converting a source address contained in a message transmitted from said one computer to the network given in terms of the computer address into the fixed address stored in the fixed address storage means, and converting a destination address contained in a message transmitted from the network to said one computer given in terms of the fixed address into the computer address stored in the computer address acquisition and storage means.

According to another aspect of the present invention there is provided a method of network communication, comprising the steps of: storing a fixed address on a network corresponding to connector means for connecting a computer to the network; acquiring and storing a computer address of the computer connected at the connector means; converting an address contained in a message for a communication between the computer and the network according to one of the fixed address stored at the storing step and the computer address acquired and stored at the acquiring and storing step; and transmitting the message with the address converted at the converting step from the computer to the network.

According to another aspect of the present invention there is provided a method of network communication, comprising the steps of: storing a fixed address on a network corresponding to each address conversion device among a plurality of address conversion devices provided in correspondence to connector means for connecting a plurality of computers to the network, in said each address conversion device; acquiring and storing a computer address of one computer connected at one connector means corresponding to said each address conversion device in said each address conversion device; and converting a source address contained in a message transmitted from said one computer to the network given in terms of the computer address into the fixed address stored at the storing step, and converting a destination address contained in a message transmitted from the network to said one computer given in terms of the fixed address into the computer address stored at the acquiring and storing step, in said each address conversion device.

According to another aspect of the present invention there is provided a network system, comprising: a network; a plurality of computers connected with each other through the network, each computer including: means for specifying visible/hidden setting for each file/directory possessed by said each computer, which indicates each file/directory to be visible or hidden with respect to other computers/users; means for reconstructing directory data to be disclosed in response to an access request to one directory possessed by said each computer from another computer/user, by selecting only those files/directories which are specified as visible with respect to said another computer/user among files/directories subordinate to said one directory; and means for disclosing the directory data reconstructed by the reconstructing means to said another computer/user in response to the access request.

According to another aspect of the present invention there is provided a method of file sharing in a network system formed by a network and a plurality of computers connected with each other through the network, comprising the steps of: specifying visible/hidden setting for each file/directory possessed by each computer, which indicates each file/ directory to be visible or hidden with respect to other computers/users, at said each computer; reconstructing directory data to be disclosed in response to an access request to one directory possessed by said each computer from another computer/user, by selecting only those files/ directories which are specified as visible with respect to said another computer/user among files/directories subordinate to said one directory, at said each computer; and disclosing the directory data reconstructed by the reconstructing means to said another computer/user in response to the access request, at said each computer.

Other features and advantages of the present invention will become apparent from the following description taken in conjunction with the accompanying drawings.

DETAILED DESCRIPTION OF THE PREFERRED EMBODIMENTS

Figure 1:
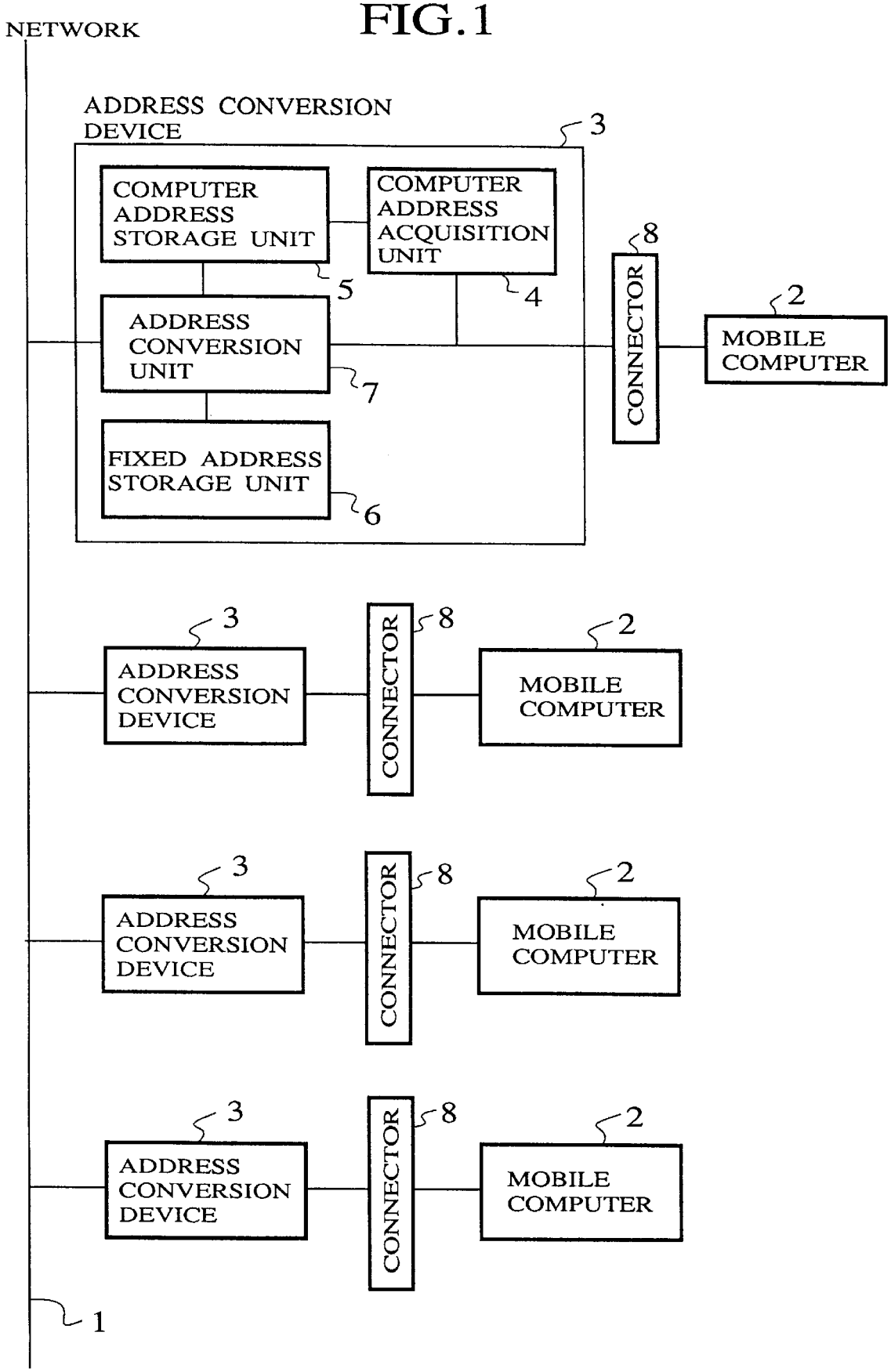
FIG. 1 is a block diagram of a first embodiment of a network system with a network communication scheme according to the present invention.

First, various embodiments of a network system with a network communication scheme according to the present invention will be described in detail.

In short, a network system with a network communication scheme according to the present invention is equipped with an address conversion device having means for storing a fixed address of the address conversion device itself on a network, means for acquiring and storing a computer address of a mobile computer to be connected to the network, and means for carrying out an address conversion according to the stored fixed address and computer address, in correspondence to each connector for connecting the computer to the network.

Each address conversion device acquires the computer address of the mobile computer connected to it from an message issued by that mobile computer, and stores the acquired computer address in the computer address storing means, while the fixed address storing means stores the fixed address of that address conversion device. Then, in a case of making a communication between a computer-A and a computer-B through the network, the address conversion device-A sends the message from the computer-A to the address conversion device-B by converting the computer address of the computer-A in that message into the fixed address stored in the fixed address storing means and using the fixed address of the address conversion device-B, and the address conversion device-B sends the received message to the computer-B by converting the fixed address of the address conversion device-B in that message into the computer address of the computer-B.

Conventionally, in a case of connecting a computer to a temporal network, there has been a need to obtain a network information such as an address from the network by a dynamic action and to change the setting of the computer according to the obtained network information. Also, it has been necessary to provide a software for carrying out such a setting change automatically on the computer side. In addition, a conventionally known address conversion method has utilized a statically defined address conversion table, so that it is not suitable for dealing with a mobile computer which is to be connected to the network in dynamic fashion.

In contrast, according to the network system according to the present invention as outlined above, a mobile computer is connected to an address conversion device which stores a fixed address in advance, acquires and stores a computer address of the connected computer, and converts the computer address into the fixed address automatically, so that there is no need to change the setting on the mobile computer side at all, and therefore there is no need to provide a software for setting change on the mobile computer side.

Moreover, from a standpoint of each computer connected to the network, the network appears to be defined in terms of the fixed addresses assigned to the address conversion devices alone, so that it suffices for each computer to recognize only these fixed addresses of the address conversion devices, and consequently the computer address of each computer can be concealed from the other computers connected to the same network.

Furthermore, as the computer address of the mobile computer is acquired by the address conversion device dynamically, an operation such as a rewriting of an address conversion table is not required at all.

Now, with reference to FIG. 1 to FIG. 4, a first specific embodiment of a network system with a network communication scheme according to the present invention as outlined above will be described.

In this first embodiment, as shown in FIG. 1, the network system comprises a network 1, a plurality of address conversion devices 3 connected through the network 1 for carrying out the address conversion for a plurality of mobile computers 2 connected thereto, and a plurality of connectors 8 connected to the respective address conversion devices 3 for enabling on-line or radio connection of a plurality of mobile computers 2 to the network 1.

Each address conversion device 3 has a fixed address on the network 1 assigned in advance, and comprises a computer address acquisition unit 4 for acquiring a computer address of the mobile computer 2 connected thereto through the connector 8, a computer address storage unit 5 for storing the acquired computer address, a fixed address storage unit 6 for storing the fixed address of this address conversion device 3, and an address conversion unit 7 for carrying out the address conversion according to the stored fixed address and computer address and transmitting messages between the network 1 and the mobile computer 2 connected thereto. Here, a message transmitted through the network 1 comprises a destination address, a source address, and a message content, and in the following, a message will be denoted by a shorthand notation of M(destination address, source address).

Figure 2:
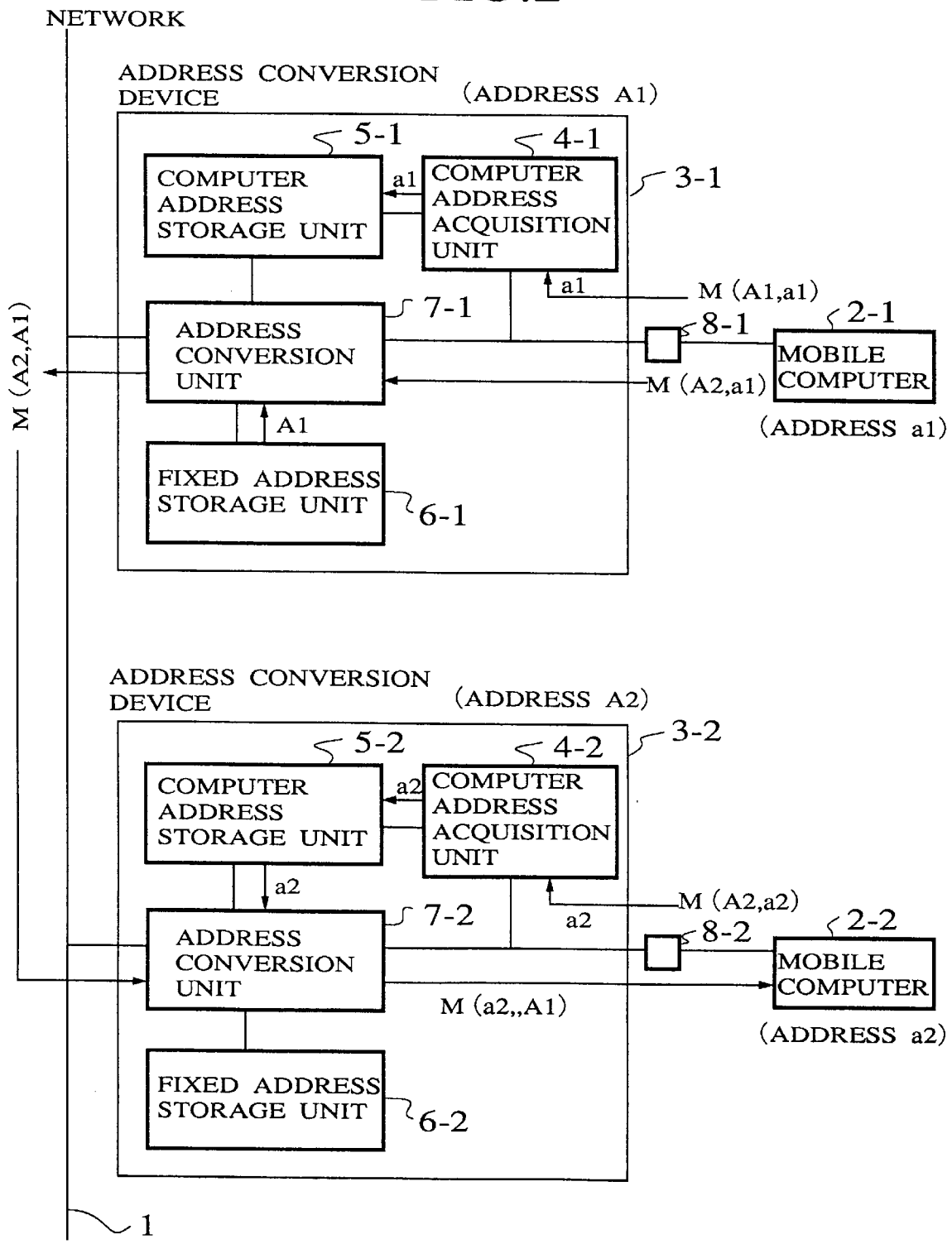
FIG. 2 is a block diagram of the network system of FIG. 1 for explaining its operation in an exemplary case of communication from one computer to another.

The operation of this network system of the first embodiment will now be described for an exemplary case shown in FIG. 2 in which one mobile computer 2-1 having a computer address a1 which is connected to one address conversion device 3-1 having a fixed address A1 communicates with another mobile computer 2-2 having a computer address a2 which is connected to another address conversion device 3-2 having a fixed address A2.

Figure 3:
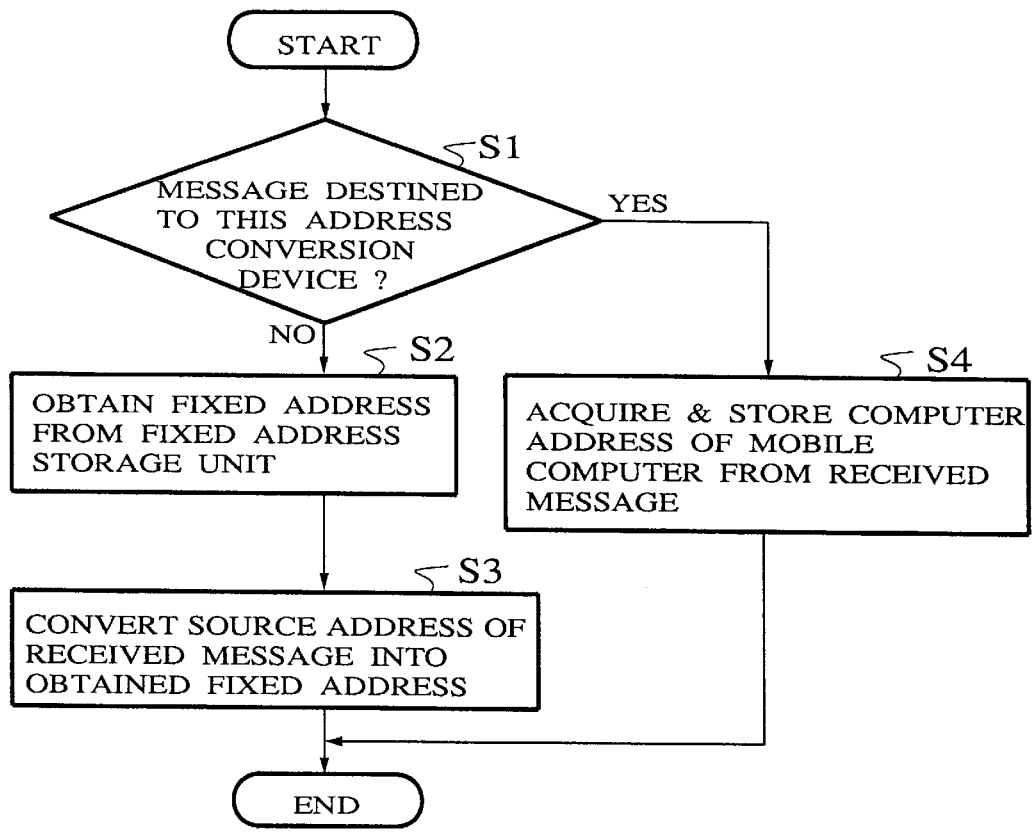
FIG. 3 is a flow chart for an operation of an address conversion device in the network system of FIG. 1 with respect to a message from a computer side.

First, for the message issued from the mobile computer 2 connected to each address conversion unit 3, each address conversion unit 3 operates according to the flow chart of FIG. 3 as follows.

Initially, at a time of connection, the mobile computers 2-1 and 2-2 transmit messages M(A1, a1) and M(A2, a2) by specifying the fixed addresses of the respective address conversion devices 3-1 and 3-2 to which they are connected, respectively. Then, at each of the address conversion devices 3-1 and 3-2, when it is recognized that it is a message destined to this address conversion device itself (S1 YES), a computer address of the connected mobile computer 2 is acquired from this message by the computer address acquisition unit 4, and registered into the computer address storage unit 5 (S4).

Thereafter, the mobile computer 2-1 carries out the communication with the mobile computer 2-2 by issuing a message in a form of M(A2, a1) by specifying the fixed address A2 of the address conversion device 3-2 to which the mobile computer 2-2 is connected. In this case, when the address conversion device 3-1 recognizes that it is not a message destined to this address conversion device itself (S1 NO), the address conversion unit 7-1 of the address conversion device 3-1 converts this message M(A2, a1) into a message M(A2, A1) by obtaining the fixed address A1 of this address conversion device 3-1 from the fixed address storage unit 6-1 (S2) and converting the source address a1 of the received message into the obtained fixed address A1 (S3). Then, the address conversion device 3-1 transmits this converted message M(A2, A1) to the address conversion device 3-2 through the network 1.

Figure 4:
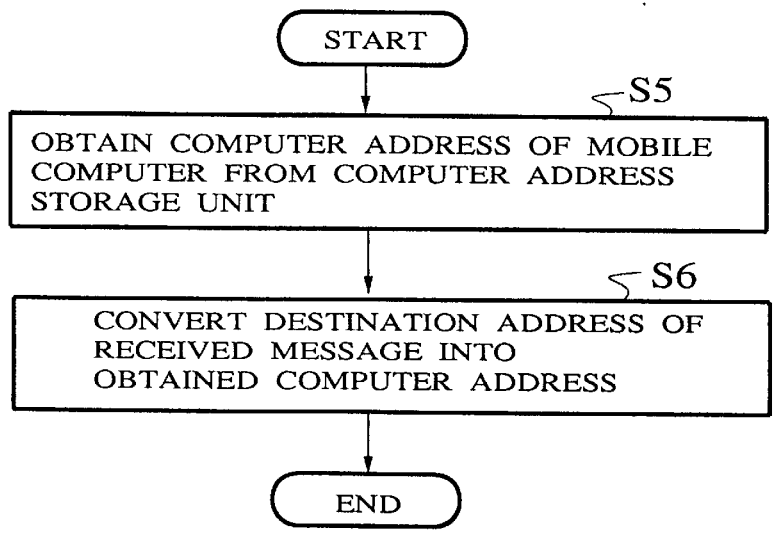
FIG. 4 is a flow chart for an operation of an address conversion device in the network system of FIG. 1 with respect to a message from a network side.

On the other hand, for the message transmitted from the other address conversion device through the network 1, each address conversion unit 3 operates according to the flow chart of FIG. 4 as follows.

Namely, the address conversion unit 7-2 of the address conversion device 3-2 which received the message from the address conversion device 3-1 converts this message M(A2, A1) into a message M(a2, A1) by obtaining the computer address a2 of the mobile computer 2-2 from the computer address storage unit 5-2 (S5), and converting the destination address A2 of the received message into the obtained computer address a2 (S6). Then, the address conversion device 3-2 transmits this converted message M(a2, A1) to the mobile computer 2-2.

In this manner, the mobile computer 2-2 effectively receives the message from mobile computer 2-1 by actually receiving the message from the address conversion device 3-1. Also, in a case of returning a response to the mobile computer 2-1 from the mobile computer 2-2, the message from the mobile computer 2-2 is effectively transmitted to the mobile computer 2-1 by actually transmitted the message to the address conversion device 3-1 in basically the same manner as described above.

Figure 6:
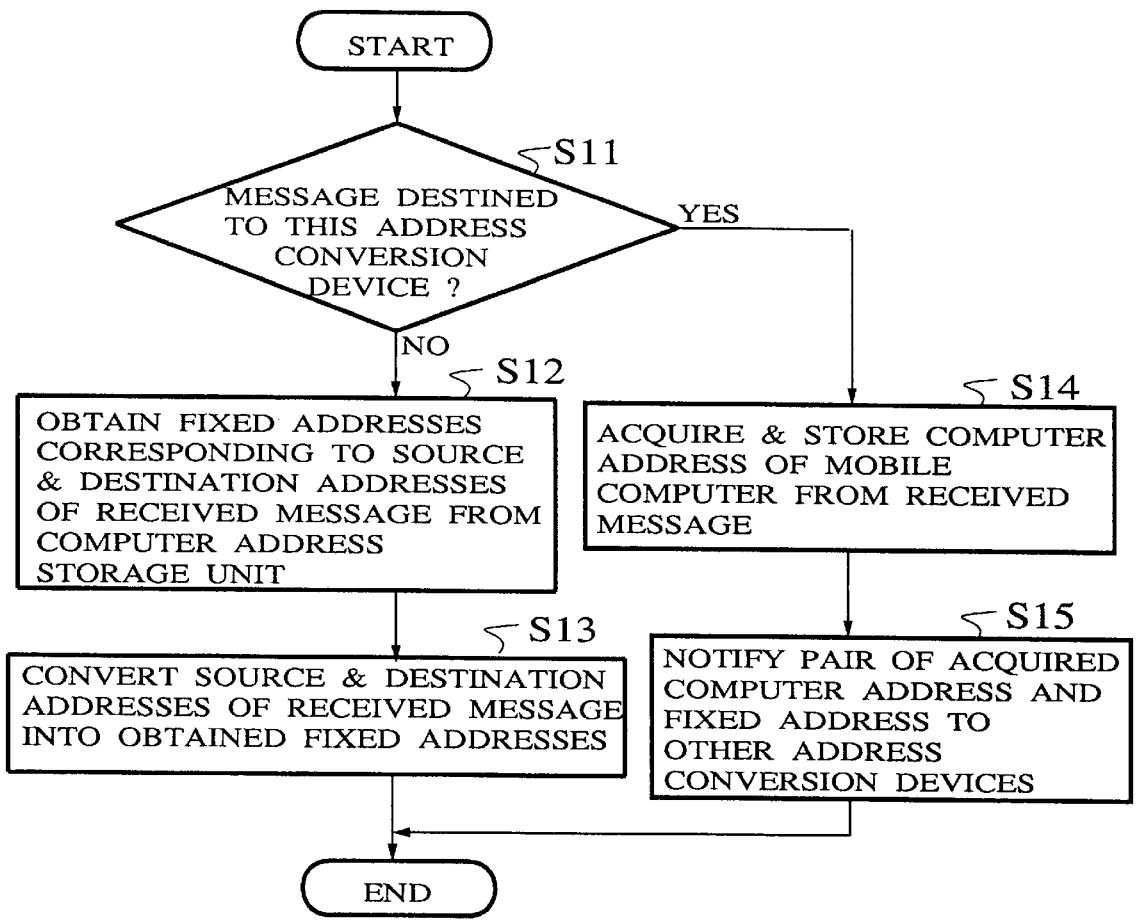
FIG. 6 is a flow chart for an operation of an address conversion device in the network system of FIG. 5 with respect to a message from a computer side.
Figure 7:
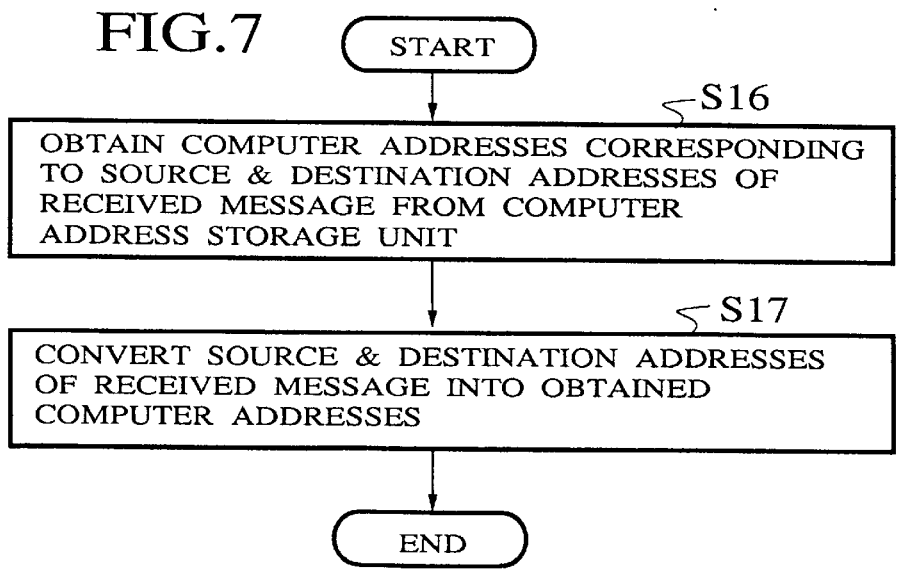
FIG. 7 is a flow chart for an operation of an address conversion device in the network system of FIG. 5 with respect to a message from a network side.

Next, with reference to FIG. 5 to FIG. 7, a second specific embodiment of a network system with a network communication scheme according to the present invention as outlined above will be described.

Figure 5:
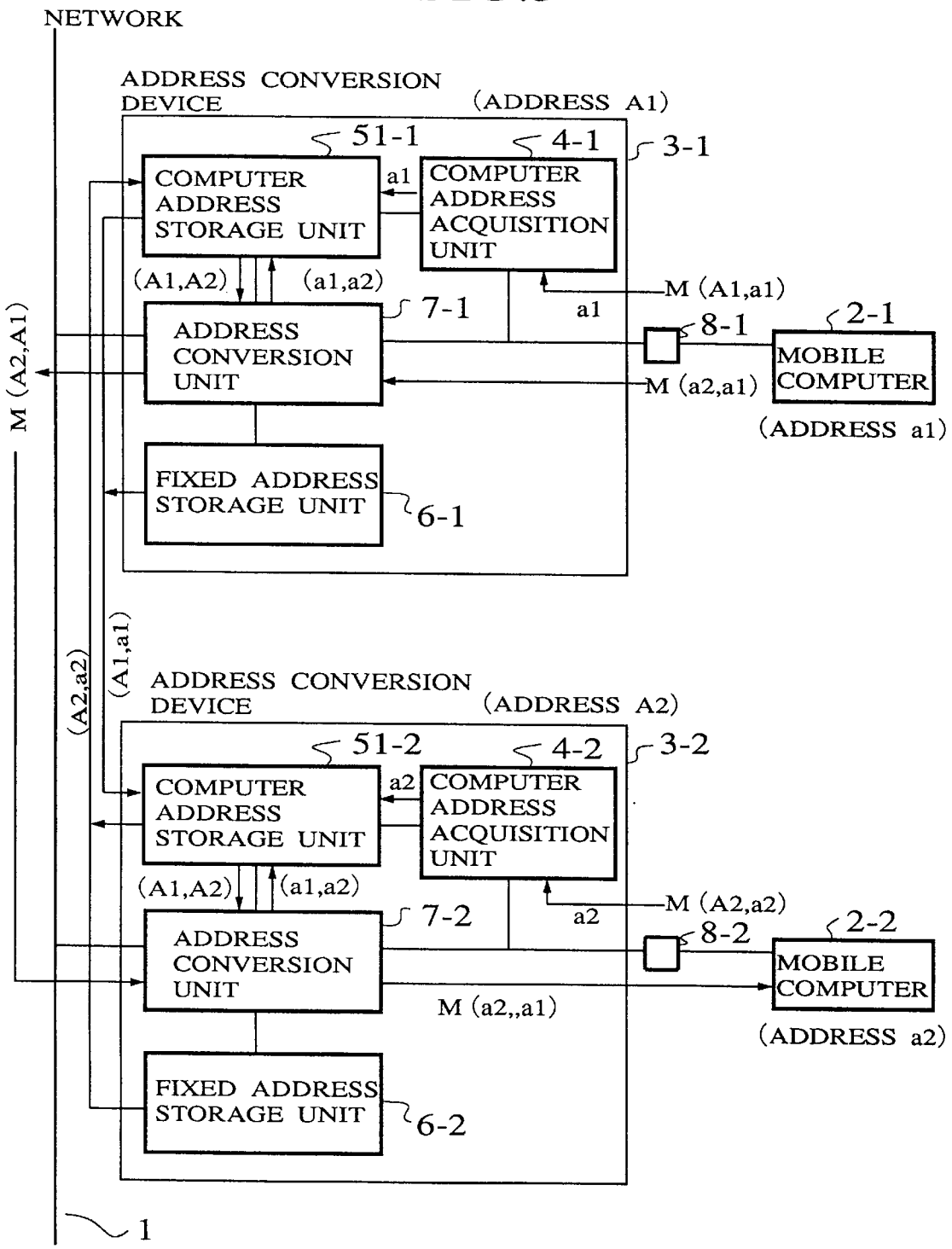
FIG. 5 is a block diagram of a second embodiment of a network system with a network communication scheme according to the present invention, for explaining its operation in an exemplary case of communication from one computer to another.

This second embodiment differs from the first embodiment described above in that a computer address storage unit 5 in each address conversion device 3 shown in the configuration of FIG. 1 is replaced by a computer address storage unit 51 as shown in FIG. 5, where the computer address storage unit 51 stores a pair of the computer address of each mobile computer 2 and the fixed address of a corresponding address conversion device 3, for all the mobile computers connected to the network 1. To this end, at a time of the acquisition of the computer address (S4 in FIG. 3), the computer address storage unit 51 of each address conversion device 3 notifies a pair of the acquired computer address and the fixed address of this address conversion device 3 to all the other address conversion devices 3.

As a consequence, in this second embodiment, it is possible for each mobile computer 2 to carry out the communication with another mobile computer 2 by specifying the computer address of another mobile computer 2 rather than the fixed address of the address conversion device 3 to which another mobile computer 2 is connected.

The operation of this network system of the second embodiment will now be described for an exemplary case shown in FIG. 5 in which one mobile computer 2-1 having a computer address a1 which is connected to one address conversion device 3-1 having a fixed address A1 communicates with another mobile computer 2-2 having a computer address a2 which is connected to another address conversion device 3-2 having a fixed address A2.

First, for the message issued from the mobile computer 2 connected to each address conversion device 3, each address conversion unit 3 operates according to the flow chart of FIG. 6 as follows.

Initially, at a time of connection, each mobile computer 2 transmits a message by specifying the fixed address of the corresponding address conversion device 3 to which it is connected, similarly as in the first embodiment. Then, at each address conversion device 3, when it is recognized that it is a message destined to this address conversion device itself (S11 YES), a computer address of the connected mobile computer 2 is acquired from this message by the computer address acquisition unit 4, and registered into the computer address storage unit 51 (S14). In addition, a pair of the acquired computer address and the fixed address of this address conversion device 3 are notified to all the other address conversion devices 3 (S15). In a case of FIG. 5, the address conversion device 3-1 notifies a pair of addresses (A1, a1) to the address conversion device 3-2, while the address conversion device 3-2 notifies a pair of addresses (A2, a2) to the address conversion device 3-1.

Thereafter, the mobile computer 2-1 carries out the communication with the mobile computer 2-2 by issuing a message in a form of M(a2, a1) by specifying the computer address a2 of the mobile computer 2-2. In this case, when the address conversion device 3-1 recognizes that it is not a message destined to this address conversion device itself (S11 NO), the address conversion unit 7-1 of the address conversion device 3-1 converts this message M(a2, a1) into a message M(A2, A1) by obtaining the fixed addresses A1 and A2 corresponding to the source and destination addresses of this message from the computer address storage unit 51-1 (S12) and converting the source and destination addresses a1 and a2 of the received message into the obtained fixed addresses A1 and A2 (S13). Then, the address conversion device 3-1 transmits this converted message M(A2, A1) to the address conversion device 3-2 through the network 1.

On the other hand, for the message transmitted from the other address conversion device through the network 1, each address conversion unit 3 operates according to the flow chart of FIG. 7 as follows.

Namely, the address conversion unit 7-2 of the address conversion device 3-2 which received the message from the address conversion device 3-1 converts this message M(A2, A1) into a message M(a2, a1) by obtaining the computer addresses a1 and a2 corresponding to the source and destination addresses of this message from the computer address storage unit 51-2 (S16), and converting the source and destination addresses A1 and A2 of the received message into the obtained computer addresses a1 and a2 (S17). Then, the address conversion device 3-2 transmits this converted message M(a2, a1) to the mobile computer 2-2.

In this manner, the mobile computer 2-2 effectively receives the message from mobile computer 2-1. Also, in a case of returning a response to the mobile computer 2-1 from the mobile computer 2-2, the message from the mobile computer 2-2 is effectively transmitted to the mobile computer 2-1 in basically the same manner as described above.

Next, with reference to FIG. 8 to FIG. 15, a third specific embodiment of a network system with a network communication scheme according to the present invention as outlined above will be described.

Figure 8:
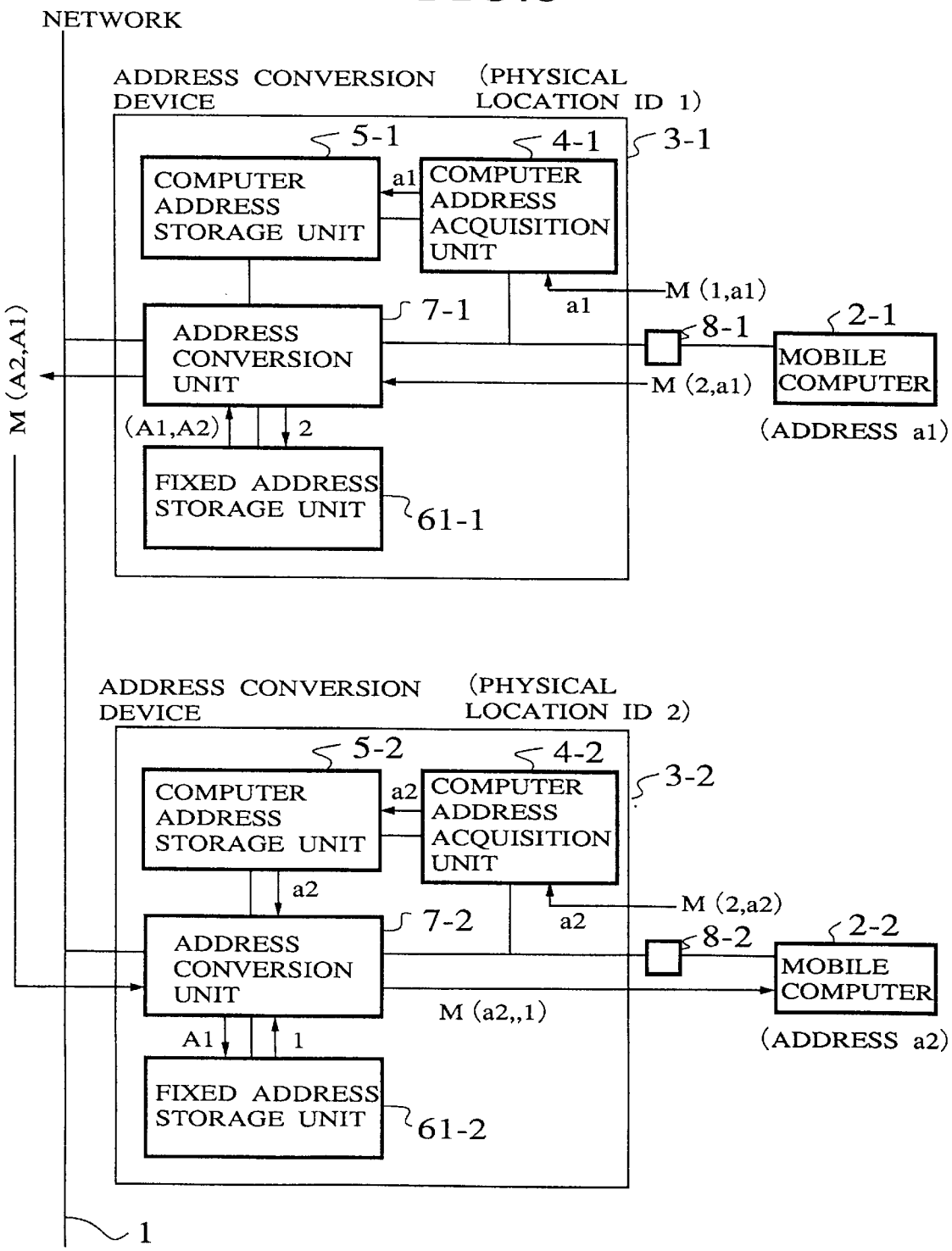
FIG. 8 is a block diagram of a third embodiment of a network system with a network communication scheme according to the present invention, for explaining its operation in an exemplary case of communication from one computer to another.

This third embodiment differs from the first embodiment described above in that a fixed address storage unit 6 in each address conversion device 3 shown in the configuration of FIG. 1 is replaced by a fixed address storage unit 61 as shown in FIG. 8, where the fixed address storage unit 61 stores a correspondence table for a physical location ID and a fixed address of each address conversion device 3, for all the address conversion devices 3 connected to the network 1, such that each mobile computer 2 carries out the communication by specifying the physical location ID of another address conversion device 3 to which a destination mobile computer 2 is connected, and the address conversion device 3 carries out the address conversion by obtaining the fixed address corresponding to the specified physical location ID from the fixed address storage unit 61.

This third embodiment is suitable for a conference room network system in which each participant of a conference brings in his own mobile computer to a conference room, connects it to a conference room network provided in the conference room, and communicate with the other participant's mobile computer by recognizing the physical location of the other participant during the conference.

In this case, the physical location ID can be utilized for the purpose of the authentication function at a time of the disclosure of data. Namely, in the conference room, each participant is physically facing with the other participants, and each participant has his own mobile computer connected to the address conversion device of the conference room network system in front of him, so that each participant can determine to whom his data should be disclosed by simply determining the physical locations of the mobile computers to which the data are to be transmitted. Consequently, each participant's act of visual authentication by actually seeing which other participant is located where in the conference room can be reflected into the determination regarding to whom the data should be disclosed.

Here, from a point of view of a communication among the computers, the disclosure of data amounts to the transmission of data possessed by one user to the other users in forms of messages, and in a distributed file system realized by means of the communication among the computers, this disclosure of data amounts to the sharing of files by transmitting messages containing file data possessed by one user to the computers of the other users.

Figures 9, 10:
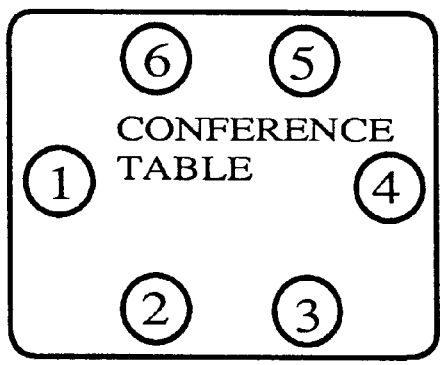
FIG. 9 is an illustration of a conference table used for a conference room network system formed by the network system of FIG. 8.
FIG. 10 is a diagrammatic illustration of a correspondence table used in a fixed address storage unit at each address conversion device in the network system of FIG. 8.

More specifically, when the conference room has a conference table around which the participants are to be seated as shown in FIG. 9, which shows an exemplary case of having six seating spots sequentially labelled by physical location IDs "1" to "6", the address conversion device 3 of this conference room network system is provided at each seating spot such that each participant at each seating spot can connect his own mobile computer to the address conversion device 3 provided at his seating spot. Here, the fixed address storage unit 61 of each address conversion device 3 stores the fixed address assigned to this address conversion device 3 in advance, along with a correspondence table of the physical location IDs and the corresponding fixed addresses of the address conversion devices 3 located at the physical locations indicated by these physical location IDs as shown in FIG. 10.

The operation of this network system of the third embodiment will now be described for an exemplary case shown in FIG. 8 in which a user using one mobile computer 2-1 having a computer address a1 which is connected to one address conversion device 3-1 having a fixed address A1 and located at a physical location "1" wishes to communicate with another user using another mobile computer 2-2 having a computer address a2 which is connected to another address conversion device 3-2 having a fixed address A2 and located at a physical location "2".

Figure 11:
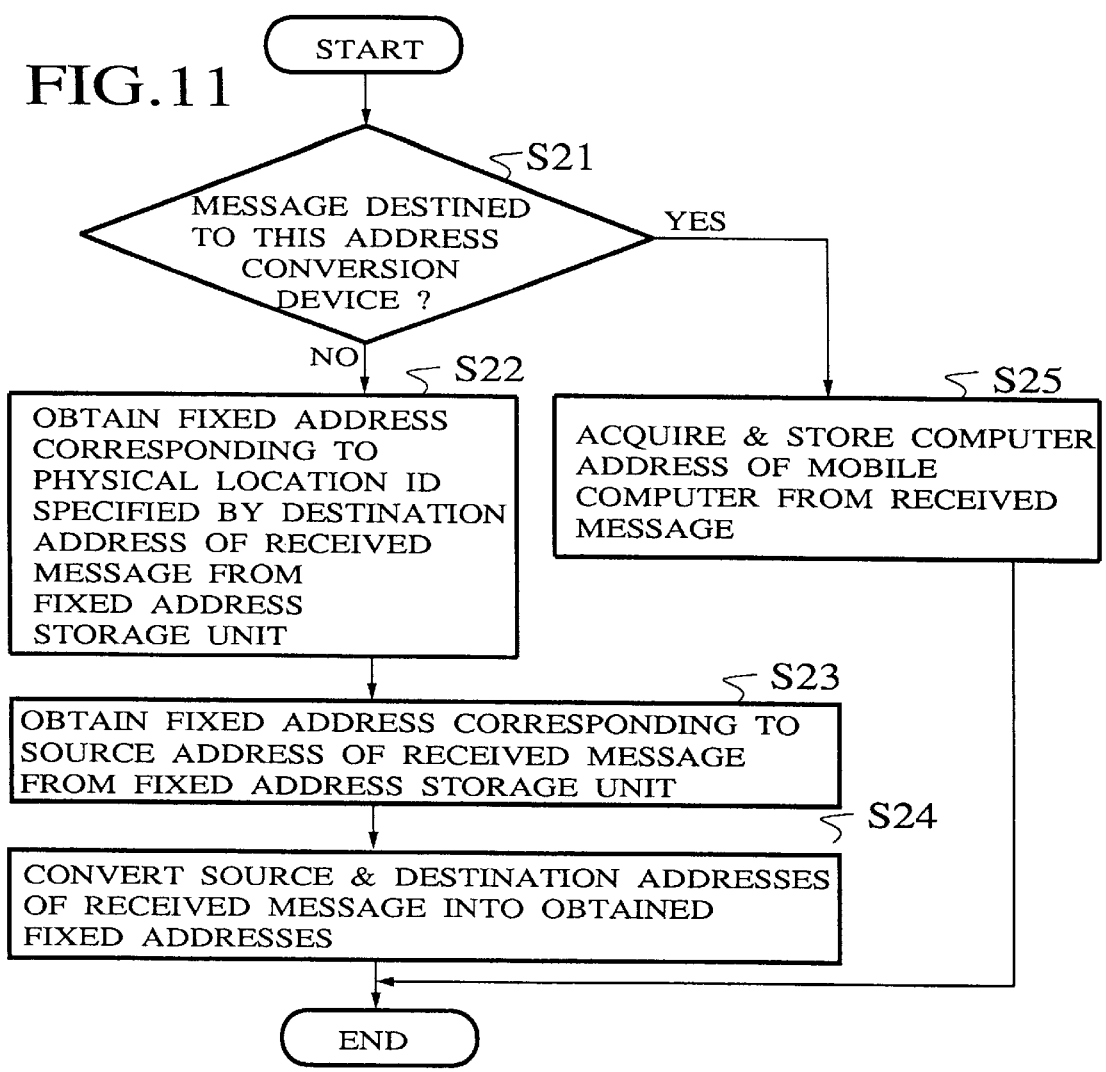
FIG. 11 is a flow chart for an operation of an address conversion device in the network system of FIG. 8 with respect to a message from a computer side.

First, for the message issued from the mobile computer 2 connected to each address conversion unit 3, each address conversion unit 3 operates according to the flow chart of FIG. 11 as follows.

Initially, at a time of connection, each mobile computer 2 transmits a message such as M(1, a1) by specifying the physical location ID of the corresponding address conversion device 3 to which it is connected. Then, at each address conversion device 3, when it is recognized that it is a message destined to this address conversion device itself (S21 YES), a computer address of the connected mobile computer 2 is acquired from this message by the computer address acquisition unit 4, and registered into the computer address storage unit 5 (S25).

Thereafter, the mobile computer 2-1 carries out the communication with the mobile computer 2-2 by issuing a message in a form of M(2, a1) by specifying the physical location ID "2" of the mobile computer 2-2. In this case, when the address conversion device 3-1 recognizes that it is not a message destined to this address conversion device itself (S21 NO), the address conversion unit 7-1 of the address conversion device 3-1 converts this message M(2, a1) into a message M(A2, A1) by obtaining the fixed address A2 corresponding to a physical location ID "2" specified by the destination address of this message according to the correspondence table of FIG. 10 in the fixed address storage unit 61-1 (S22), obtaining the fixed address A1 corresponding to the source address of this message from the fixed address storage unit 61-1 (S23), and converting the source and destination addresses a1 and "2" of the received message into the obtained fixed addresses A1 and A2 (S24). Then, the address conversion device 3-1 transmits this converted message M(A2, A1) to the address conversion device 3-2 through the network 1.

Figure 12:
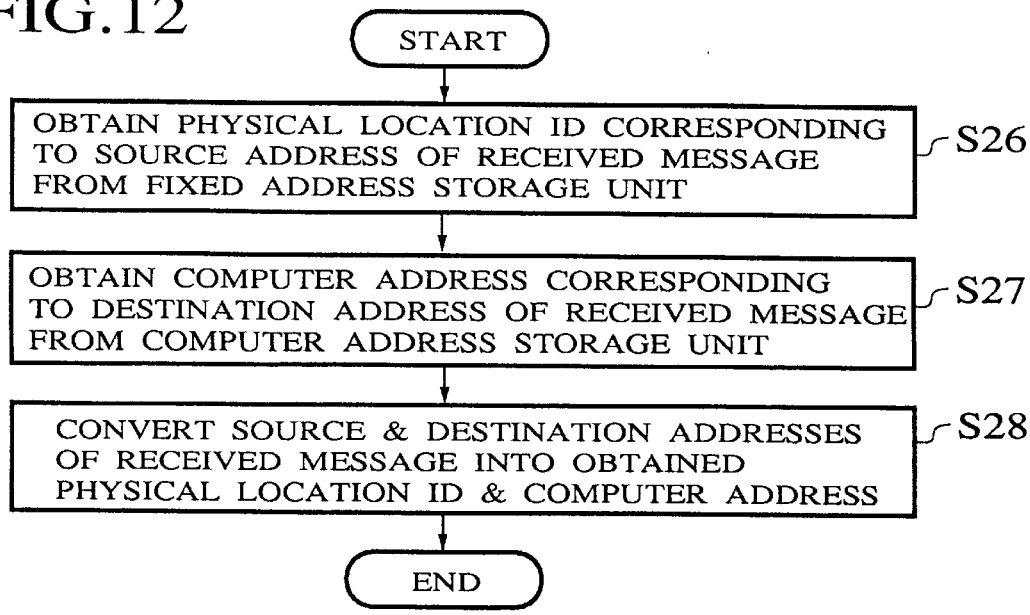
FIG. 12 is a flow chart for an operation of an address conversion device in the network system of FIG. 8 with respect to a message from a network side.

On the other hand, for the message transmitted from the other address conversion device through the network 1, each address conversion unit 3 operates according to the flow chart of FIG. 12 as follows.

Namely, the address conversion unit 7-2 of the address conversion device 3-2 which received the message from the address conversion device 3-1 converts this message M(A2, A1) into a message M(a2, 1) by obtaining the physical location ID corresponding to the source address of this message according to the correspondence table of FIG. 10 in the fixed address storage unit 61-2 (S26), obtaining the computer addresses a2 corresponding to the destination address of this message from the computer address storage unit 5-2 (S27), and converting the source and destination addresses A1 and A2 of the received message into the obtained physical location ID "1" and computer addresses a2 (S28). Then, the address conversion device 3-2 transmits this converted message M(a2, 1) to the mobile computer 2-2.

In this manner, each mobile computer can effectively communicate with the other mobile computer by simply recognizing the physical location ID associated with the other mobile computer such as a seat number of a seating spot at which a user using the other mobile computer is seated, Also, in a case of returning a response to the mobile computer 2-1 from the mobile computer 2-2, the message from the mobile computer 2-2 is effectively transmitted to the mobile computer 2-1 in basically the same manner as described above.

Thus, in a practical circumstance, the conference room network system according to this third embodiment operates as follows.

Figure 13:
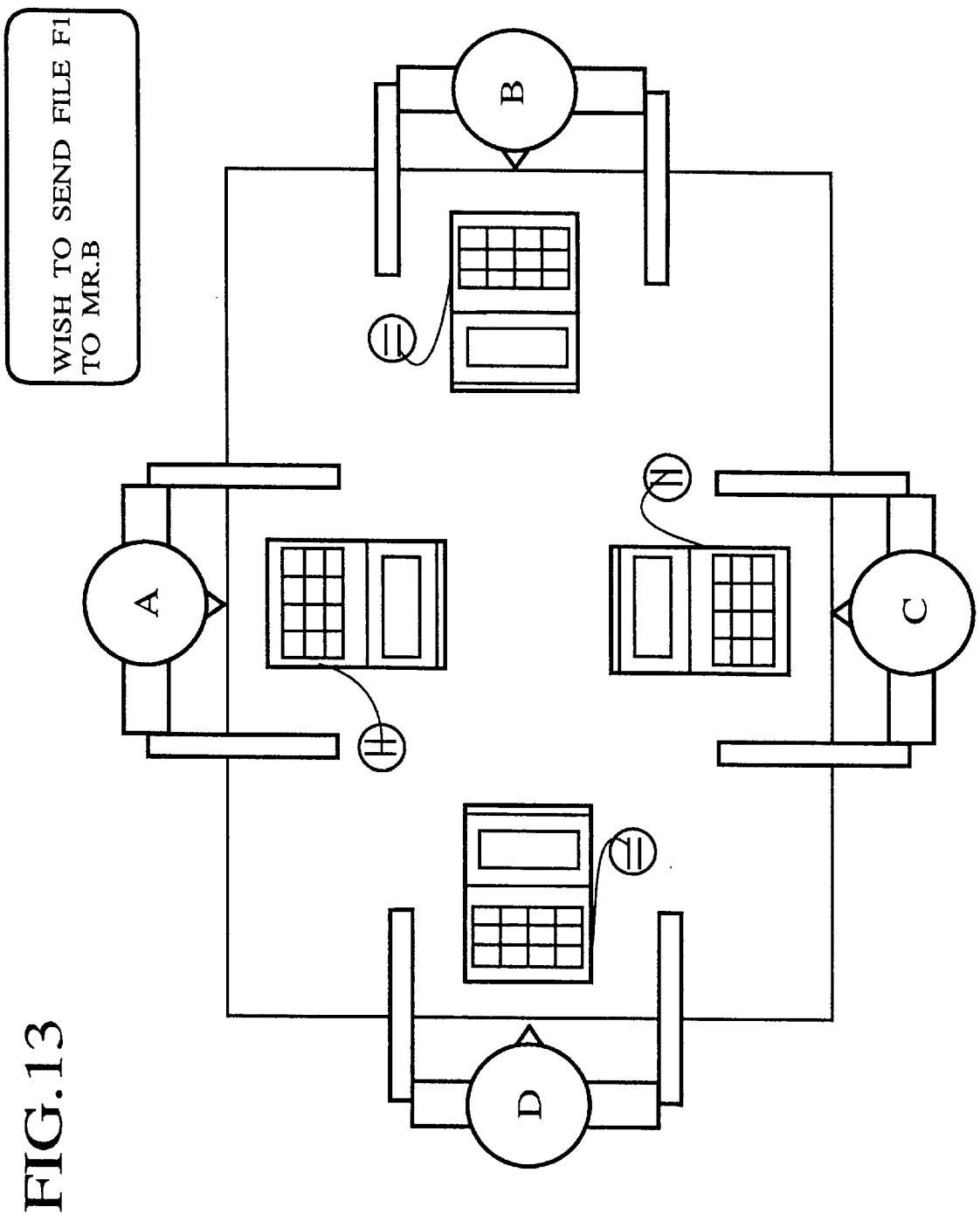
FIG. 13 is an illustration of a state of a conference room using a conference room network system formed by the network system of FIG. 8.
Figure 14:
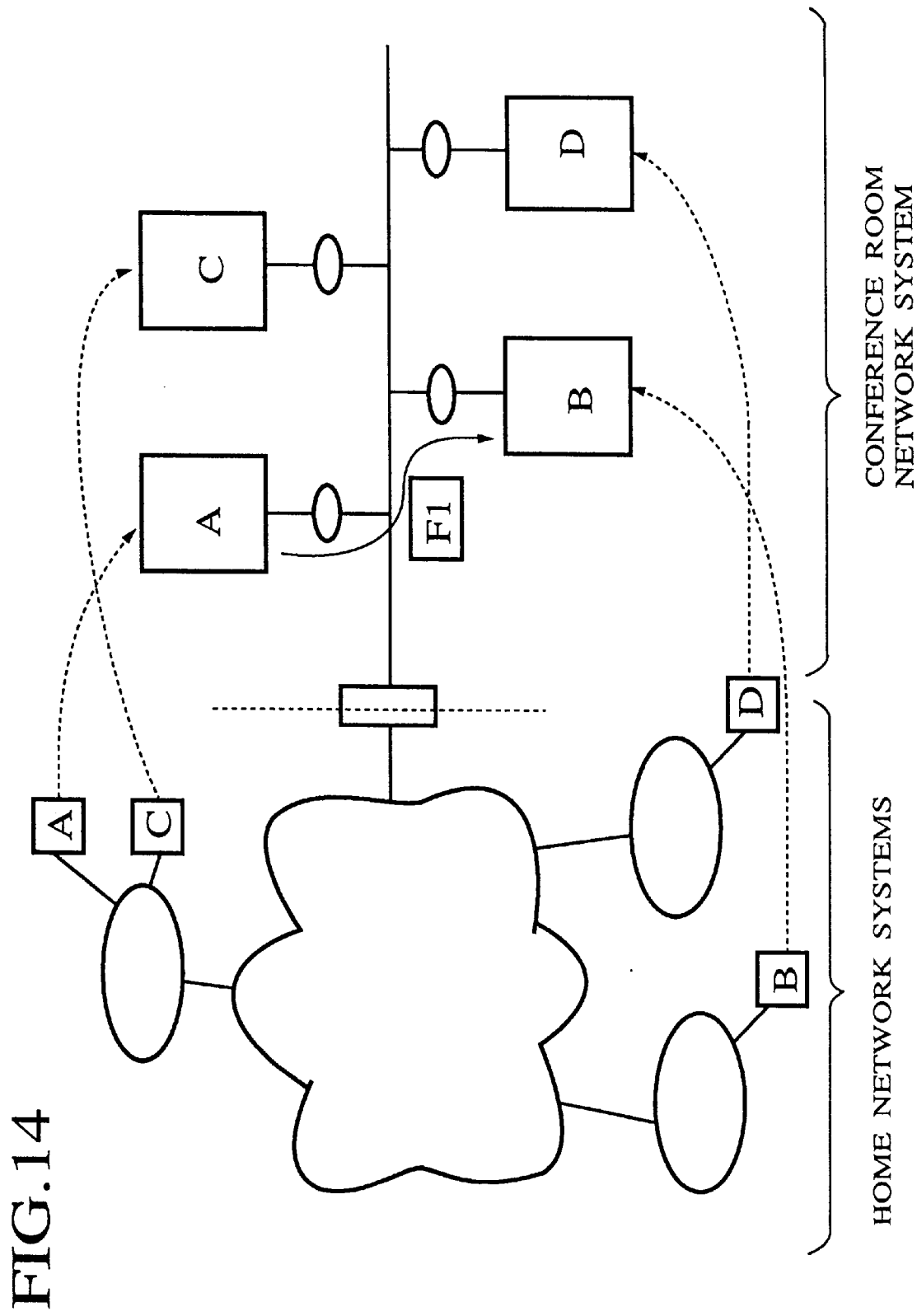
FIG. 14 is a diagram showing relationships between the conference room network system of FIG. 13 and home network systems.

Namely, consider a conference participated by four participants Messrs. A, B, C, and D as shown in FIG. 13, in which Mr. A wishes to send a file F1 to Mr. B, and suppose that the Mr. A and Mr. C have mobile computers belonging to the same home network, but Mr. B and Mr. C have mobile computers belong to the different home networks as shown in FIG. 14.

Figure 15:
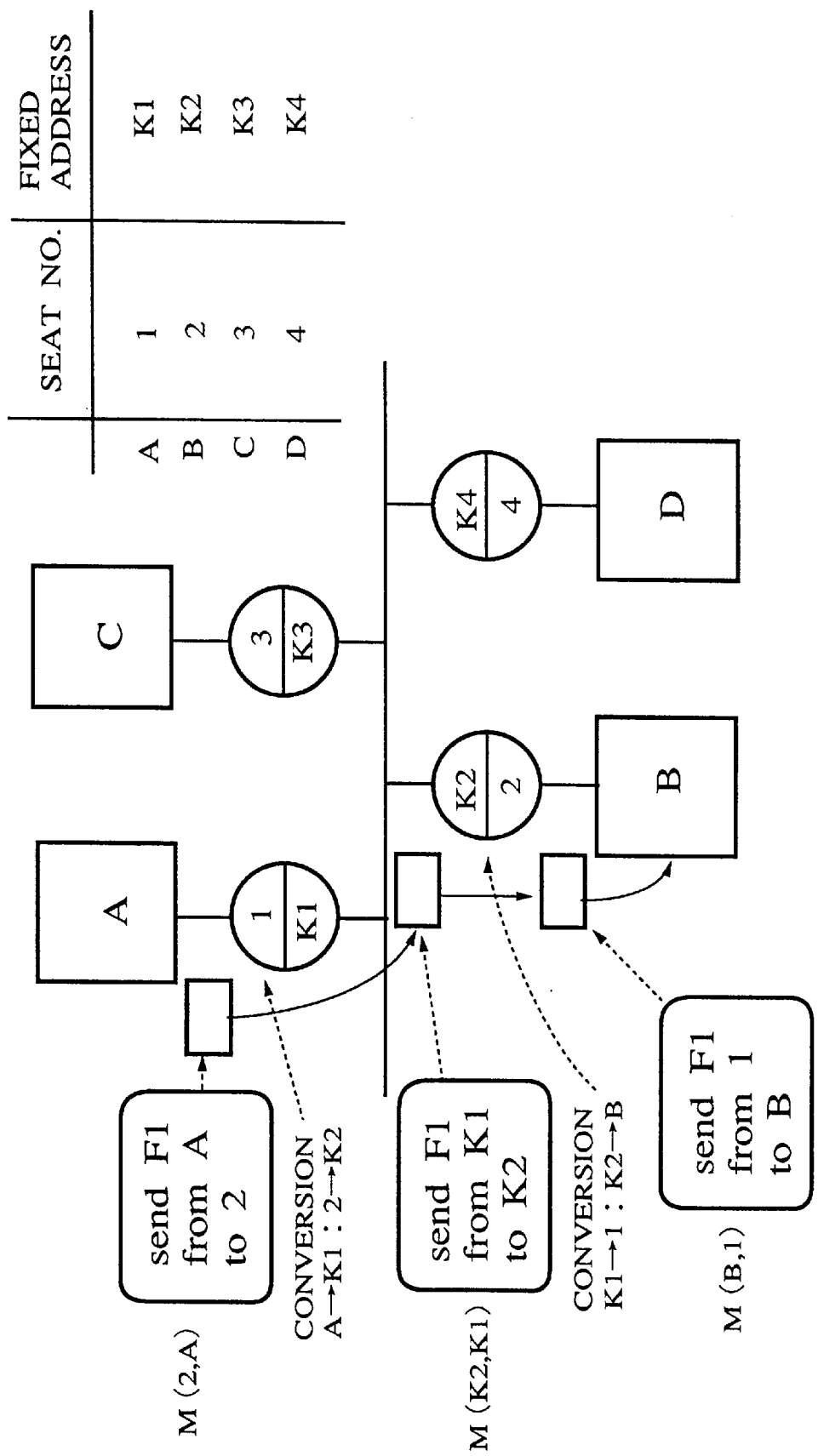
FIG. 15 is a diagram for explaining an exemplary operation carried out in the conference room network system of FIG. 13.

In this case, the conference room network system according to the third embodiment works as shown in FIG. 15, such that it suffices for Mr. A to send a message M(2, A) containing the file data for the file F1 by specifying its own computer address "A" as the source address and a seat number "2" of Mr. B as the destination address.

Then, the address conversion device associated with Mr. A automatically converts the source address "A" of this message into the fixed address "K1" of this address conversion device, and the destination address "2" of this message into the fixed address "K2" corresponding to the seat number "2" according to the correspondence table shown in FIG. 15, so that the converted message M(K2, K1) is transmitted through the network.

Then, the address conversion device associated with Mr. B which received this message through the network automatically converts the source address "K1" of this message into the seat number "1" according to the correspondence table shown in FIG. 15, and the destination address "K2" of this message into the computer address "B" of Mr. B. so that Mr. B receives the message (B, 1) containing the file data for the file F1.

Figure 17:
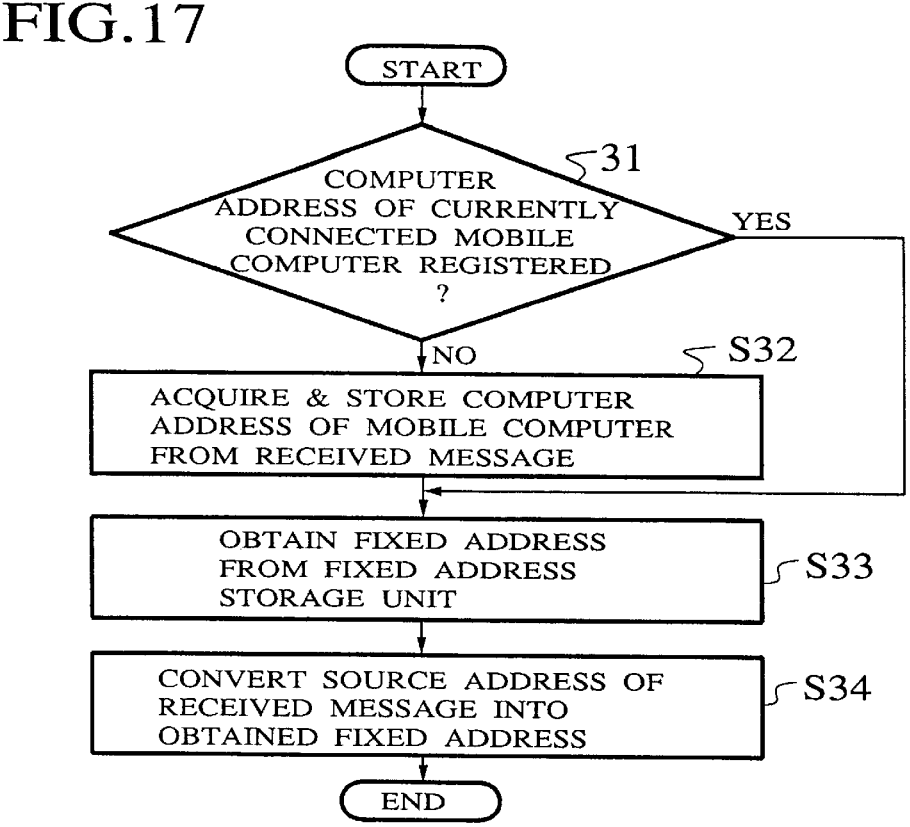
FIG. 17 is a flow chart for an operation of an address conversion device in the network system of FIG. 16 with respect to a message from a computer side.
Figure 18:
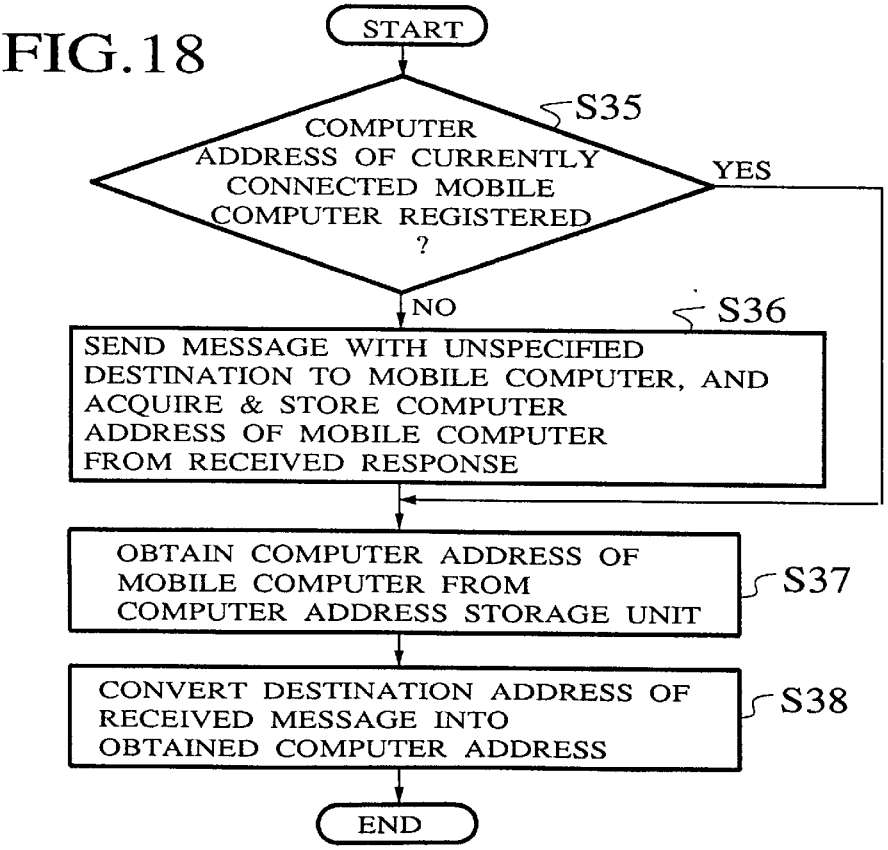
FIG. 18 is a flow chart for an operation of an address conversion device in the network system of FIG. 16 with respect to a message from a network side.

Next, with reference to FIG. 16 to FIG. 18, a fourth specific embodiment of a network system with a network communication scheme according to the present invention as outlined above will be described.

Figure 16:
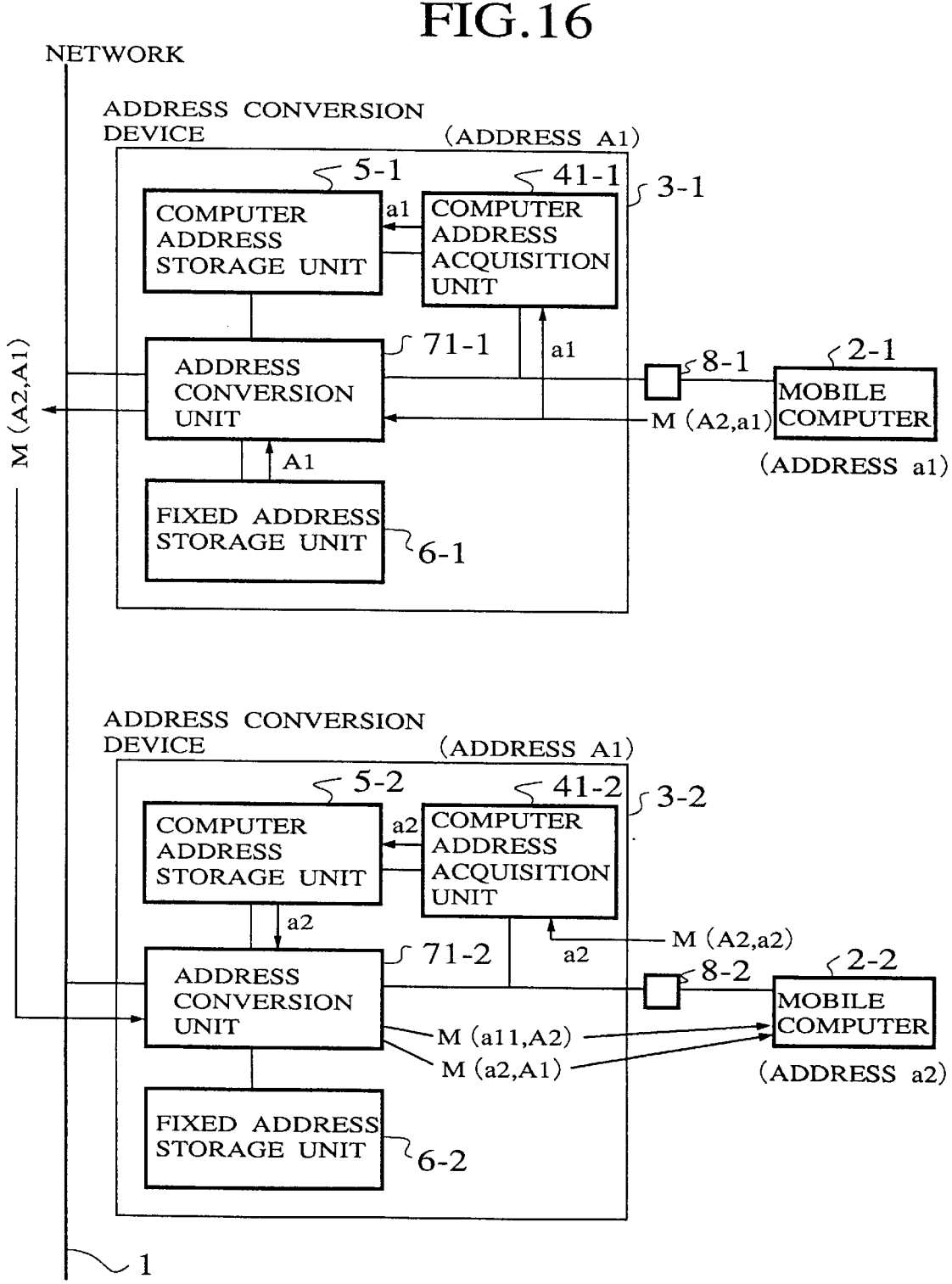
FIG. 16 is a block diagram of a fourth embodiment of a network system with a network communication scheme according to the present invention, for explaining its operation in an exemplary case of communication from one computer to another.

This fourth embodiment differs from the first embodiment described above in that a computer address acquisition unit 4 and an address conversion unit 7 in each address conversion device 3 shown in the configuration of FIG. 1 is replaced by a computer address acquisition unit 41 and an address conversion unit 71 as shown in FIG. 16, where the address conversion unit 71 has additional function for sending a message with unspecified destination to the mobile computer 2 connected to this address conversion device 3, and the computer address acquisition unit 41 acquires the computer address of the mobile computer 2 from an initial message issued by the mobile computer 2 connected to this address conversion device 3.

Namely, in this fourth embodiment, the computer address to be stored in the computer address storage unit 5 is acquired from the first message issued by the mobile computer connected to this address conversion device 3, which is not necessarily issued at a time of the connection of the mobile computer 2 to the address conversion device 3 in this case. Thus, when the computer address of the mobile computer 2 connected to this address conversion device 3 is not stored in the computer address storage unit 5 at a time of the address conversion for the message received from the other address conversion device, i.e., when the message from the other address conversion device is received before an initial message is issued by the mobile computer 2 connected to this address conversion device 3, the computer address to be stored in the computer address storage unit 5 is acquired from a response from the mobile computer 2 connected to this address conversion device 3 with respect to a message with unspecified destination which is sent from the address conversion unit 71 to the mobile computer 2 connected to this address conversion device 3.

In this manner, it becomes unnecessary for the mobile computer 2 to make a message transmission to the address conversion device 3 at a time of the connection to the network 1 for the purpose of computer address acquisition in this fourth embodiment.

Note here that many known networks are provided with means for sending a message with unspecified destination and requesting a response. For example, in the internet, when the broadcast (i.e., transmission of a message with unspecified destination) is made according to a protocol called ICMP, the responses from all the computers connected that network can be obtained. This fourth embodiment utilizes such a means to send a message with unspecified destination from the address conversion unit 71 toward the connector 8 in a case the address conversion device 3 does not know the computer address of the mobile computer 2 currently connected at the connector 8 for this address conversion device 3, and receive a response from the currently connected mobile computer 2 so as to be able to acquire the computer address of this mobile computer 2 from this response.

The operation of this network system of the fourth embodiment will now be described for an exemplary case shown in FIG. 16 in which one mobile computer 2-1 having a computer address a1 which is connected to one address conversion device 3-1 having a fixed address A1 communicates with another mobile computer 2-2 having a computer address a2 which is connected to another address conversion device 3-2 having a fixed address A2.

First, for the message issued from the mobile computer 2 connected to each address conversion unit 3, each address conversion unit 3 operates according to the flow chart of FIG. 17 as follows.

Initially, the mobile computer 2-1 transmits a message M(A2, a1) to the address conversion device 3-1 in order to make a communication with the mobile computer 2-2. Then, when the address conversion device 3-1 does not have a computer address of this mobile computer 2-1 in the computer address storage unit 5-1 (S31 NO), the computer address of this mobile computer 2-1 is acquired from this message by the computer address acquisition unit 41-1, and registered into the computer address storage unit 5 (S32), whereas otherwise (S31 YES) this step S32 is skipped.

Then, the address conversion unit 71-1 of the address conversion device 3-1 converts this message M(A2, a1) into a message M(A2, A1) by obtaining the fixed address A1 of this address conversion device 3-1 from the fixed address storage unit 6-1 (S33) and converting the source address a1 of the received message into the obtained fixed address A1 (S34). Then, the address conversion device 3-1 transmits this converted message M(A2, A1) to the address conversion device 3-2 through the network 1.

On the other hand, for the message transmitted from the other address conversion device through the network 1, each address conversion unit 3 operates according to the flow chart of FIG. 18 as follows.

Namely, when the address conversion device 3-2 which received the message from the address conversion device 3-1 does not have a computer address of the mobile computer 2-2 in the computer address storage unit 5-2 (S35 NO), the address conversion unit 71-2 of this address conversion device 3-2 sends a message M(all, A2) with unspecified destination and its fixed address as the source address to the mobile computer 2-2, and the computer address of this mobile computer 2-2 is acquired from a response message M(A2, a2) issued by this mobile computer 2-2 at the computer address acquisition unit 41-2 and registered into the computer address storage unit 5 (S36), whereas otherwise (S35 YES) this step S36 is skipped.

Then, the address conversion unit 71-2 of the address conversion device 3-2 which received the message from the address conversion device 3-1 converts this message M(A2, A1) into a message M(a2, A1) by obtaining the computer address a2 of the mobile computer 2-2 from the computer address storage unit 5-2 (S37), and converting the destination address A2 of the received message into the obtained computer address a2 (S38). Then, the address conversion device 3-2 transmits this converted message M(a2, A1) to the mobile computer 2-2.

In this manner, the mobile computer 2-2 effectively receives the message from mobile computer 2-1. Also, in a case of returning a response to the mobile computer 2-1 from the mobile computer 2-2, the message from the mobile computer 2-2 is effectively transmitted to the mobile computer 2-1 in basically the same manner as described above.

Figure 19:
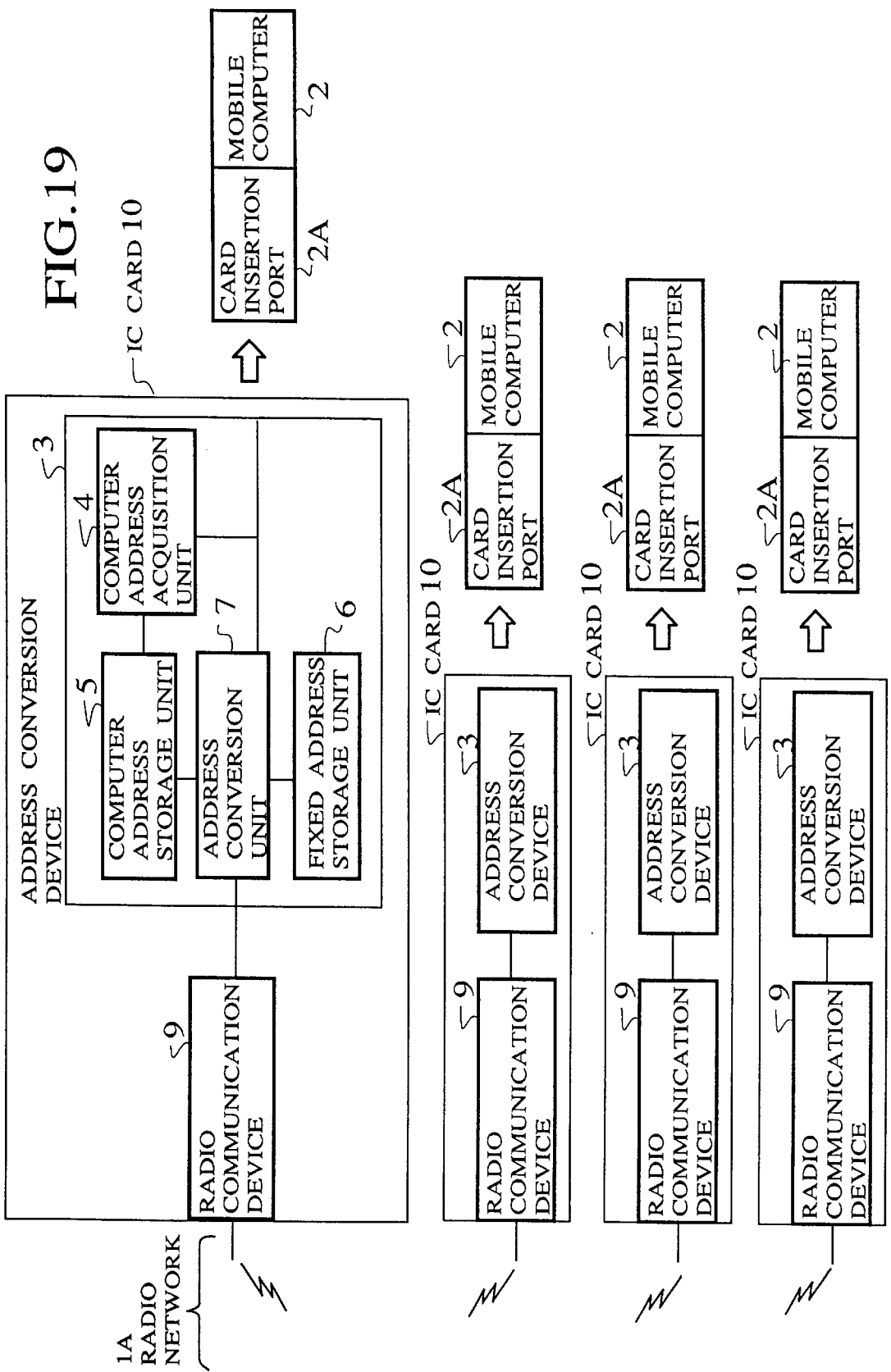
FIG. 19 is a block diagram of a fifth embodiment of a network system with a network communication scheme according to the present invention.

Next, with reference to FIG. 19, a fifth specific embodiment of a network system with a network communication scheme according to the present invention as outlined above will be described.

This fifth embodiment differs from the first embodiment described above in that, as shown in FIG. 19, the on-line network 1 in the configuration of FIG. 1 is replaced by a radio network 1A, each address conversion unit 3 is implemented on an IC card 10 along with a radio communication device 9 for transmitting/receiving radio signals to be transmitted/received by the address conversion unit 7 through the radio network 1A, and each mobile computer 2 is equipped with a card insertion port 2A for receiving the IC card 10.

The operation of this network system of the fifth embodiment is basically the same as that of the first embodiment described above.

In this fifth embodiment, instead of providing the address conversion device 3 at each seating spot of the conference room network system as described for the third embodiment, the compact IC card 10 is distributed to the participants of the conference. Each participant then inserts this IC card 10 into the card insertion port 2A of his own mobile computer 2 so as to realize the communication through the radio network 1A.

When a number of participants of the conference is known in advance, a unique IC card number can be assigned to each IC card to be given to each participant, such that the communication with another participant can be made by specifying the IC card number of the IC card given to that another participant. In this case, instead of the authentication using the physical location as in the third embodiment described above, the authentication using the IC card number can be realized in a similar manner.

It is to be noted that the various modifications made on the first embodiment by the second to fourth embodiments described above may also be made similarly on this fifth embodiment as well.

Next, various embodiments of a network system with a file sharing scheme according to the present invention will be described in detail.

In short, a network system with a file sharing scheme according to the present invention forms a distributed file system in which each one of a plurality of computers manages files by using a directory structure, and one computer can make an access to a file of another computer. This system includes means for specifying each file or directory as visible or hidden with respect to other computer or a group of computers, or other user or a group of users, and means for reconstructing a directory data at a time of disclosing a certain directory data to other computer or a group of computers, other user or a group of users, by checking whether each one of that certain directory and each file or sub-directory subordinate to that certain directory is visible or hidden with respect to each computer or user to which that certain directory data are to be disclosed.

In this system, the owner of each file or directory specifies whether each file or directory is to be visible or hidden with respect to other computer or a group of computers, or other user or a group of users, and in response to an access request with respect to a certain directory, the system checks the access right for each file or directory, and reconstructs the directory data for that requested directory only by using those files and directories subordinate to that requested directory which are specified as visible. Here, the disclosure of data amounts to the sharing of files by transmitting messages containing file data possessed by one user to the computers of the other users, as already mentioned in relation to the third embodiment described above.

In a conventional distributed file system, when the directory is disclosed, the existence of all the files and directories subordinate to that directory is going to be known by the other users, but in the present invention, each file or directory subordinate to the directory to be disclosed can be specified as visible or hidden, and the directory data can be reconstructed at a time of disclosure of the directory according to such a visible/hidden data, so that it is possible to disclose different structures for different users or computers even with respect to the same directory.

Here, the disclosure of data in this distributed file system is actually realized by a communication using addresses of source and destination computers, and when this system includes mobile computers, a network communication can be realized in a form of any of the network systems of the first to fifth embodiments described above.

In particular, when the network communication scheme according to the third embodiment described above is combined with the file sharing scheme as outlined above by using mobile computers in the distributed file system, it becomes possible to authenticate the disclosure target by means of the visual authentication by each user, while the visible/hidden setting for each file can be specified by each user in addition. For instance, it is possible for each user to realize a flexible file sharing scheme according to the physical locations of the other users such that it becomes possible to disclose only a file F1 to a user at one physical location while disclosing files F1 and F2 to another user at another physical location for example, by simply specifying visible/hidden setting for each file with respect to each physical location according to the visual information regarding which user corresponds to which physical location. Note here that the disclosure of data is physically realized by means of message communications among computers using the address conversion among the computer address, the fixed address, and the physical location IDs as described in the third embodiment in this case.

Now, with reference to FIG. 20 to FIG. 24, a sixth embodiment of a network system with a file sharing scheme according to the present invention as outlined above will be described in detail.

Figure 20:
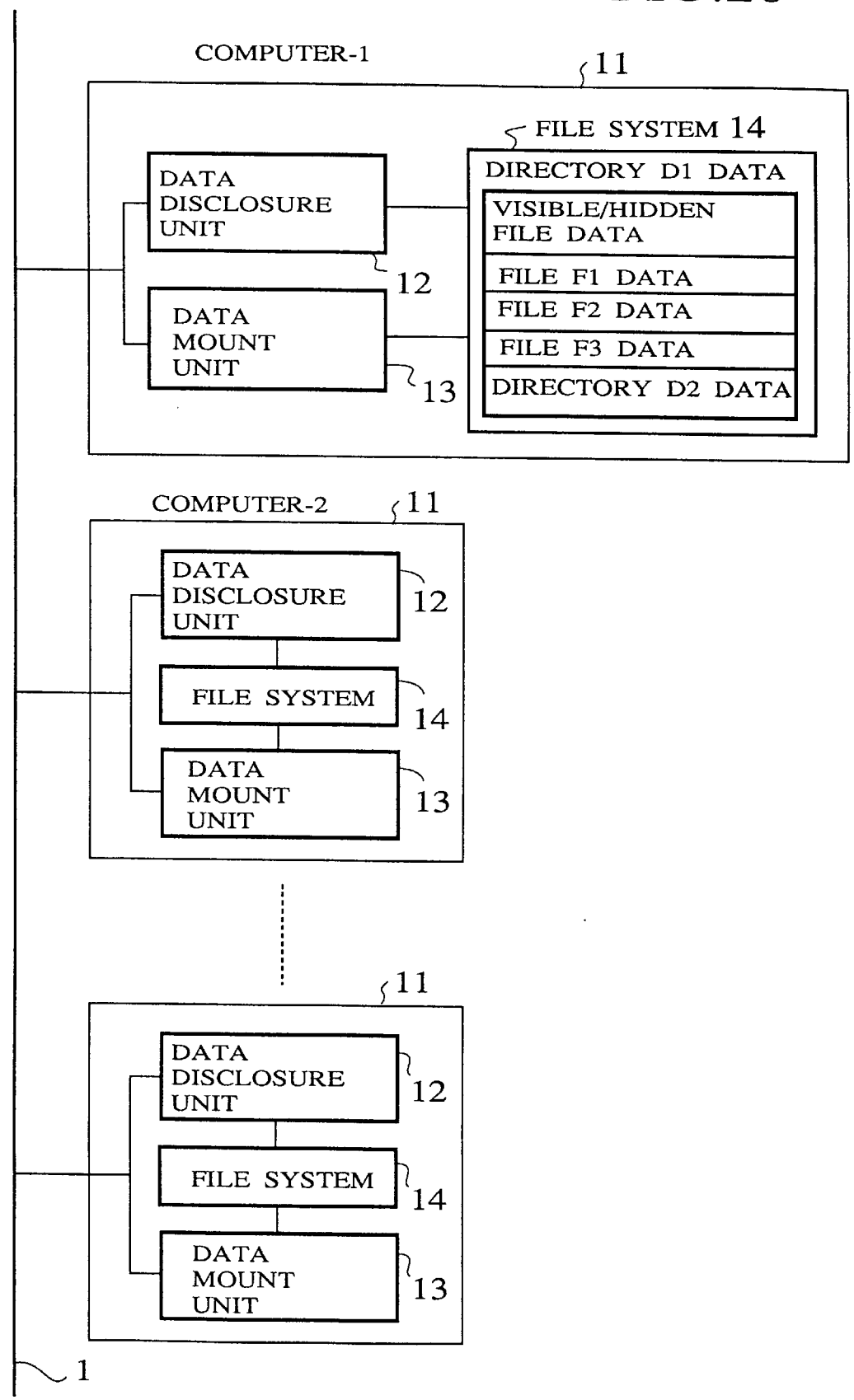
FIG. 20 is a block diagram of a sixth embodiment of a network system with a file sharing scheme according to the present invention.
Figures 21, 22:
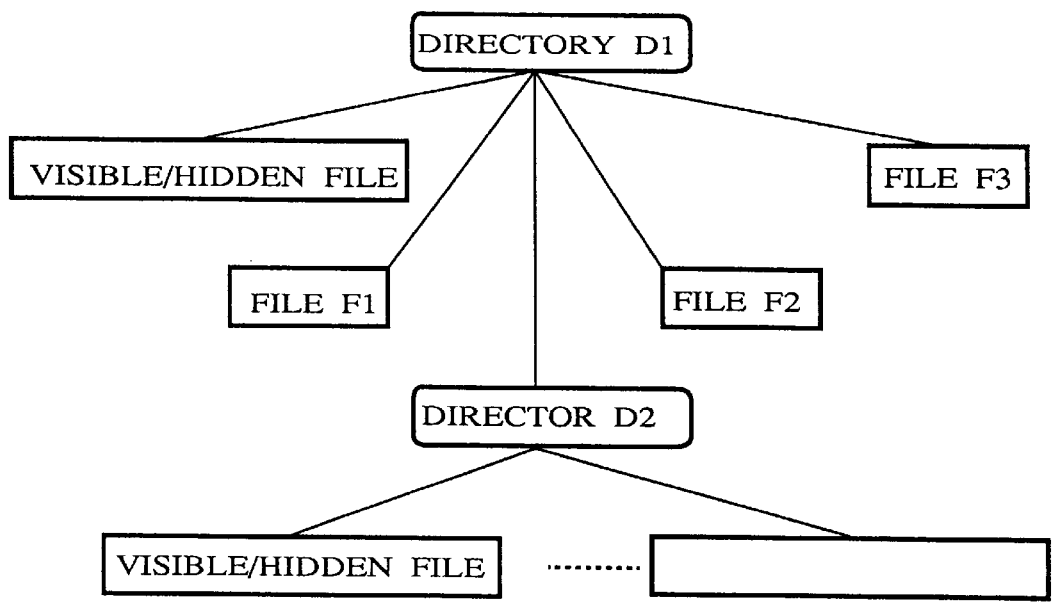
FIG. 21 is a diagrammatic illustration of a directory structure possessed by one computer in the network system of FIG. 20.
FIG. 22 is a diagrammatic illustration of a visible/hidden file in the directory structure shown in FIG. 21.

As shown in FIG. 20, in this sixth embodiment, the network system comprises a network 1 and a plurality of computers 11 connected through the network 1, where each computer 11 includes a data disclosure unit 12 for disclosing data (files and directories) possessed by each computer 11, a data mount unit 13 for requesting data with respect to the other computers 11 and mounting the obtained data, and a file system 14 for managing file data and directory data. Here, the file system 14 manages the file data and the directory data by means of a structure as shown in FIG. 21, which includes a plurality of files and directories along with a visible/hidden file for registering visible/hidden setting for each file or directory under one directory. The sub-directory of the directory also has a similar structure as indicated in FIG. 21. Also, as shown in FIG. 22, the visible/hidden file for each directory registers users/hosts to whom each file or directory subordinate to that directory is set to be visible.

The operation of this network system of the sixth embodiment will now be described for an exemplary case in which a computer-1 has a structure for the directory D1 as shown in FIG. 21 and a computer-2 requests data of the directory D1 to the computer-1 in the configuration of FIG. 20.

Figure 23:
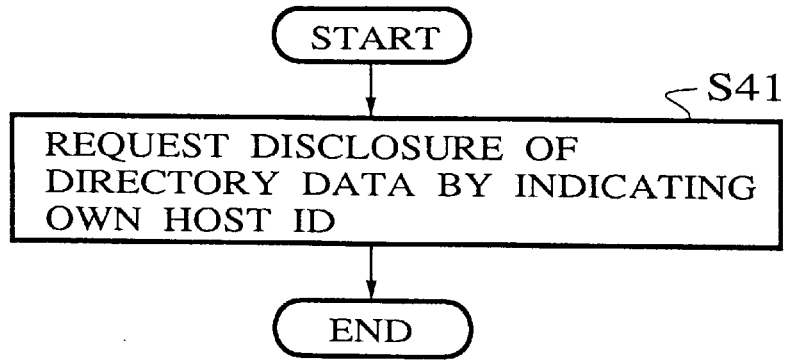
FIG. 23 is a flow chart for an operation of a data mount unit in one computer of the network system of FIG. 20.

First, the data mount unit 13 of the computer 11 requesting the data disclosure operates according to the flow chart of FIG. 23 as follows.

Namely, the data mount unit 13 of the computer-2 requests the disclosure of directory data by indicating its own host ID (host2) as a requesting computer ID (S41).

Figure 24:
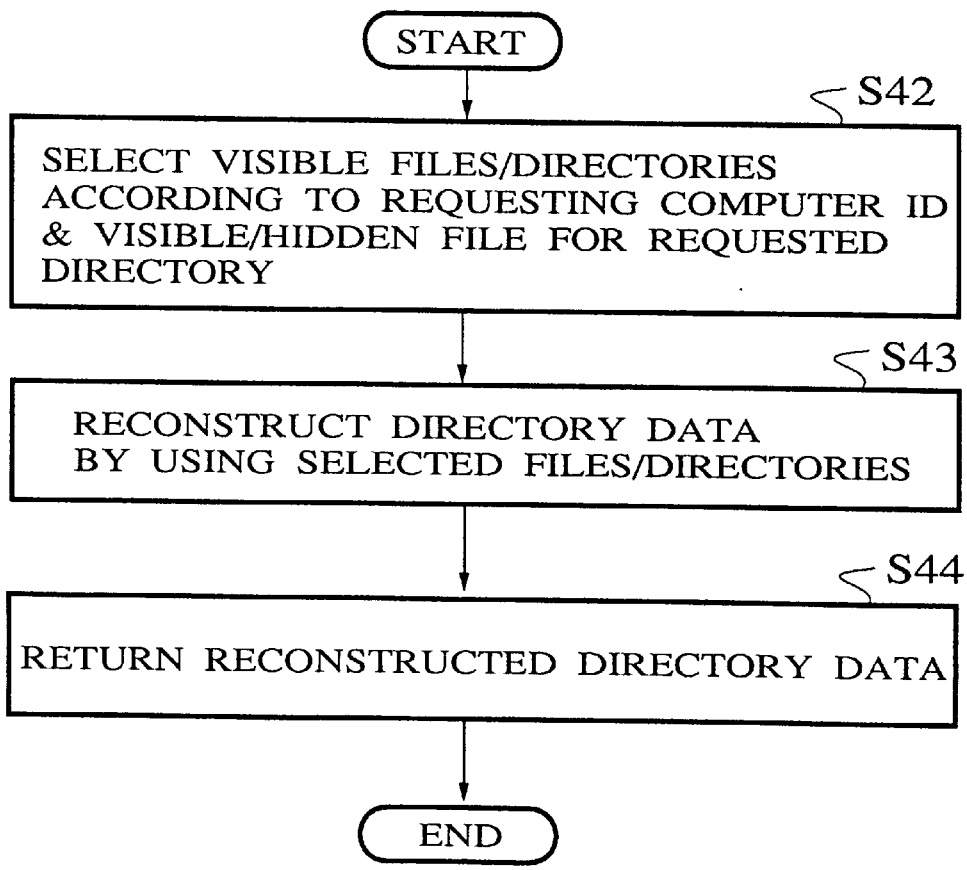
FIG. 24 is a flow chart for an operation of a data disclosure unit in one computer of the network system of FIG. 20.

In response, the data disclosure unit 12 of the computer 11 which received the request operates according to the flow chart of FIG. 24 as follows.

Namely, the data disclosure unit 12 of the computer-1 selects the visible files/directories (files F1 and F2) subordinate to the requested directory (directory D1) according to the requesting computer ID (host2) indicated by the request and the visible/hidden file for the requested directory (directory D1) (S42), reconstructs the directory data for the requested directory (directory D1) by using the selected files/directories alone (S43), and returns the reconstructed directory data to the data mount unit 13 of the computer-2 as the disclosed directory data (S44).

The computer-2 which received this returned directory data can then make an access to the file F1 or the file F2 according to the usual access right setting for each file, so as to share these files of the computer-1.

In the above, it is assumed that the usual access right for the directory D1 is in a readable setting. In general, in response to the access request, the system checks the access right for the requested directory first, and when it is in a readable setting, the visible/hidden file for the requested directory is checked to select only those files and sub-directories subordinate to the requested directory which are set to be visible. When the requesting computer further requests a specific data out of the returned data, the similar procedure is repeated.

Next, the seventh embodiment of a network system with a file sharing scheme according to a present invention as outlined above will be described in detail.

This seventh embodiment differs from the sixth embodiment described above in that, instead of specifying the visible/hidden setting by means of the visible/hidden file, the visible/hidden setting is specified by expanding the access right for each file or directory in this seventh embodiment.

In the access control with respect to a file provided by the conventional UNIX, the access right indicating readable, writable, and executable settings can be specified with respect to three types of subject including an owner, a group, and others. In this seventh embodiment, this access right is expanded to indicate four settings including readable, writable, executable, and visible settings in the access right, and at a time of the disclosure of directory data, the data disclosure unit 12 in the configuration of FIG. 20 carries out the reconstruction of the directory data by selecting the visible files according to the access rights for all the files and directories subordinate to the requested directory, instead of the steps S42 and S43 in the flow chart of FIG. 24.

It is also possible to realize a more flexible access control by using the ACL (Access Control List) than the conventional UNIX. In the ACL, the access right for each file can be set up in the following format.

user: foo1: rwxci group: foo2: r----

In the above setting, with respect to the user called "foo1", the access right indicates five settings including readable (r), writable (w), executable (x), ACL changeable (c), and insertable (i), while with respect to the group called "foo2", the access right indicates one setting of readable (r) alone. In addition to these attributes of the access right, this seventh embodiment adds a new attribute of visible (v), so that when the ACL is utilized in this seventh embodiment, the access right for each file can be set up in the following format.

user: foo1: rwxciv group: foo2: r----v

The reconstruction of the directory data is then carried out according to such an expanded access right. In this manner, even when the directory data has changed due to the shift or the deletion of the files, it is possible to the disclosure of different structures to different users or computers, without requiring an editing of the visible/hidden file.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A network system of computers connected by a network, comprising:

connector means for connecting a computer to the network;

fixed address storage means for storing a fixed address on the network corresponding to the connector means;

computer address acquisition and storage means for acquiring and storing a computer address of the computer connected at the connector means from the computer; and means for converting an address contained in a message for a communication between the computer and the network according to one of the fixed address stored in the fixed address storage means and the computer address stored in the computer address acquisition and storage means.

2. A network system of computers connected by a network, comprising:

a plurality of connector means for connecting a plurality of computers to the network;

a plurality of address conversion devices provided in correspondence to the connector means, each address conversion device including:

fixed address storage means for storing a fixed address on the network corresponding to said each address conversion device;

computer address acquisition and storage means for acquiring and storing a computer address of one computer connected at one connector means corresponding to said each address conversion device; and conversion means for converting a source address contained in a message transmitted from said one computer to the network given in terms of the computer address into the fixed address stored in the fixed address storage means, and converting a destination address contained in a message transmitted from the network to said one computer given in terms of the fixed address into the computer address stored in the computer address acquisition and storage means.

3. The network system of claim 2, wherein:

the computer address acquisition and storage means also acquires and stores a correspondence between a computer address of another computer connected at another connector means corresponding to another address conversion device and a fixed address on the network corresponding to said another address conversion device, for said plurality of address conversion devices; and the conversion means also converts a destination address contained in the message transmitted from said one computer to the network given in terms of the computer address into the fixed address according to the correspondence stored in the computer address acquisition and storage means.

4. The network system of claim 3, wherein the conversion means also converts a source address contained in the message transmitted from the network to said one computer given in terms of the fixed address into the computer address according to the correspondence stored in the computer address acquisition and storage means.

5. The network system of claim 2, wherein:

the fixed address storage means also stores a correspondence between a physical location identifier for identifying a physical location of said one connector means corresponding to said each address conversion device and the fixed address on the network corresponding to said each address conversion device; and the conversion means converts also converts a destination address contained in the message transmitted from said one computer to the network given in terms of the physical location identifier into the fixed address according to the correspondence stored in the fixed address storage means.

6. The network system of claim 5, wherein the conversion means also converts a source address contained in the message transmitted from the network to said one computer given in terms of the fixed address into the physical location identifier according to the correspondence stored in the fixed address storage means.

7. The network system of claim 2, wherein when the computer address acquisition and storage means does not store the computer address of said one computer at a time of converting the destination address contained in the message transmitted from the network to said one computer, the conversion means sends a message with unspecified destination to said one connector means and the computer address acquisition and storage means acquires and stores the computer address of said one computer according to a response to said message with unspecified destination issued by said one computer, and then the conversion means converts the destination address contained in the message transmitted from the network to said one computer given in terms of the fixed address into the computer address stored in the computer address acquisition and storage means.

8. The network system of claim 2, wherein said network is a radio network such that said plurality of address conversion devices communicate with each other by radio signal transmissions through the radio network.

9. The network system of claim 8, wherein said each address conversion device is implemented in a form of an IC card, while each of said connector means is implemented in a form of an IC card insertion port provided on each computer such that said each computer is connected to the radio network when said IC card is inserted into the IC card insertion port.

10. The network system of claim 2, wherein the network, said plurality of connector means, and said plurality of address conversion devices are fixedly provided in a conference room, while said plurality of computers are mobile computers brought into the conference room and connected to the connector means by a plurality of users.

11. The network system of claim 2, wherein each computer includes:
    means for specifying visible/hidden setting for each file/directory possessed by said each computer, which indicates each file/directory to be visible or hidden with respect to other computers/users;
    means for reconstructing directory data to be disclosed in response to an access request to one directory possessed by said each computer which is transmitted from another computer/user in a form of a message, by selecting only those files/directories which are specified as visible with respect to said another computer/user among files/directories subordinate to said one directory; and
    means for disclosing the directory data reconstructed by the reconstructing means to said another computer/user in a form of a message in response to the access request.

12. The network system of claim 11, wherein the specifying means specifies the visible/hidden setting for each file/directory in a form of visible/hidden file for each directory possessed by said each computer.

13. The network system of claim 11, wherein each computer further includes:
    means for specifying access right indicating whether each file/directory possessed by said each computer is to be accessible or not from other computers/users, such that the visible/hidden setting is specified along with the access right, and an access from said another computer/user to the files/directories in the directory data disclosed by the disclosing means is controlled according to the access right.

14. The network system of claim 2, wherein the fixed address storage means stores the fixed address which identifies a physical location of each connector means corresponding to said each address conversion device.

15. A method of network communication, comprising the steps of:
    storing a fixed address on a network corresponding to connector means for connecting a computer to the network;
    acquiring and storing a computer address of the computer connected at the connector means from the computer;
    converting an address contained in a message for a communication between the computer and the network according to one of the fixed address stored at the storing step and the computer address acquired and stored at the acquiring and storing step; and
    transmitting the message with the address converted at the converting step from the computer to the network.

16. A method of network communication, comprising the steps of:
    storing a fixed address on a network corresponding to each address conversion device among a plurality of address conversion devices provided in correspondence to connector means for connecting a plurality of computers to the network, in said each address conversion device;
    acquiring and storing a computer address of one computer connected at one connector means corresponding to said each address conversion device in said each address conversion device; and
    converting a source address contained in a message transmitted from said one computer to the network given in terms of the computer address into the fixed address stored at the storing step, and converting a destination address contained in a message transmitted from the network to said one computer given in terms of the fixed address into the computer address stored at the acquiring and storing step, in said each address conversion device.

17. The method of claim 16, wherein:
    the acquiring and storing step also acquires and stores a correspondence between a computer address of another computer connected at another connector means corresponding to another address conversion device and a fixed address on the network corresponding to said another address conversion device, for said plurality of address conversion devices; and
    the converting step also converts a destination address contained in the message transmitted from said one computer to the network given in terms of the computer address into the fixed address according to the correspondence stored at the acquiring and storing step.

18. The method of claim 17, wherein the converting step also converts a source address contained in the message transmitted from the network to said one computer given in terms of the fixed address into the computer address according to the correspondence stored at the acquiring and storing step.

19. The method of claim 16, wherein:
    the storing step also stores a correspondence between a physical location identifier for identifying a physical location of said one connector means corresponding to said each address conversion device and the fixed address on the network corresponding to said each address conversion device; and the converting step converts also converts a destination address contained in the message transmitted from said one computer to the network given in terms of the physical location identifier into the fixed address according to the correspondence stored at the storing step.

20. The method of claim 19, wherein the converting step also converts a source address contained in the message transmitted from the network to said one computer given in terms of the fixed address into the physical location identifier according to the correspondence stored at the storing step.

21. The method of claim 16, further comprising the step of sending a message with unspecified destination to said one connector means when the computer address of said one computer is not yet acquired and stored by the acquiring and storing step at a time of converting the destination address contained in the message transmitted from the network to said one computer at the converting step, such that the acquiring and storing step acquires and stores the computer address of said one computer according to a response to said message with unspecified destination issued by said one computer, and then the converting step converts the destination address contained in the message transmitted from the network to said one computer given in terms of the fixed address into the computer address stored at the acquiring and storing step.

22. The method of claim 16, wherein said network is a radio network such that said plurality of address conversion devices communicate with each other by radio signal transmissions through the radio network.

23. The method of claim 22, wherein said each address conversion device is implemented in a form of an IC card, while each of said connector means is implemented in a form of an IC card insertion port provided on each computer, such that at the connecting step, said each computer is connected to the radio network when said IC card is inserted into the IC card insertion port.

24. The method of claim 16, wherein at the providing step, said plurality of address conversion devices are fixedly provided in a conference room along with the network and said plurality of connector means, while at the connecting step, said plurality of computers are mobile computers brought into the conference room and connected to the connector means by a plurality of users.

25. The method of claim 16, further comprising the steps of:
    specifying visible/hidden setting for each file/directory possessed by each computer, which indicates each file/directory to be visible or hidden with respect to other computers/users, at said each computer;
    reconstructing directory data to be disclosed in response to an access request to one directory possessed by said each computer which is transmitted from another computer/user in a form of a message, by selecting only those files/directories which are specified as visible with respect to said another computer/user among files/directories subordinate to said one directory, at said each computer; and
    disclosing the directory data reconstructed by the reconstructing means to said another computer/user in a form of a message in response to the access request, at said each computer.

26. The method of claim 25, wherein the specifying step specifies the visible/hidden setting for each file/directory in a form of visible/hidden file for each directory possessed by said each computer.

27. The method of claim 25, further comprising the step of specifying access right indicating whether each file/directory possessed by said each computer is to be accessible or not from other computers/users, at said each computer, such that the visible/hidden setting is specified along with the access right, and an access from said another computer/user to the files/directories in the directory data disclosed by the disclosing means is controlled according to the access right.

28. The method of claim 16, wherein the storing step stores the fixed address which identifies a physical location of each connector means corresponding to said each address conversion device.

29. A network system of computers connected by a network, comprising;
    a plurality of computers connected with each other through the network, each computer including:
    means for specifying a visible/hidden setting for each file/directory possessed by said computer, which indicates whether each file/directory is to be visible or hidden with respect to each other computer/user of the network;
    means for selectively reconstructing directory data to be disclosed in response to an access request from a requesting computer/user to a directory possessed by the computer by selecting only those files/directories which are specified as visible with respect to said requesting computer/user among files/directories subordinate to said directory; and
    means for disclosing the directory data selectively reconstructed by the reconstructing means to said requesting computer/user in response to the access request.

30. The network system of claim 29, wherein the specifying means specifies the visible/hidden setting for each file/directory in a form of visible/hidden file for each directory possessed by said each computer.

31. The network system of claim 29, wherein each computer further includes:
    means for specifying at each computer an access right indicating whether each file/directory possessed by the computer is to be accessible by each other computer/user of the network, such that the visible/hidden setting is specified along with the access right, and an access from a requesting computer/user to the computer is controlled according to the access right.

32. A method of file sharing in a network system formed by a network and a plurality of computers connected with each other through the network, comprising the steps of:
    specifying in each computer a visible/hidden setting for each file/directory possessed by the computer, which indicates whether each file/directory is to be visible or hidden with respect to each other computer/user of the network;
    selectively reconstructing in a requested computer of the network directory data to be disclosed to a requesting computer/user in response to an access request by said requesting computer/user, by selecting only those files/directories which are specified as visible with respect to said requesting computer/user among files/directories subordinate to the requested directory; and
    disclosing directory data selectively reconstructed at the requested computer to said requesting computer/user in response to the access request.

33. The method of claim 32, wherein the specifying step specifies the visible/hidden setting for each file/directory in a form of visible/hidden file for each directory possessed by said each computer.

34. The method of claim 32, further comprising the step of specifying at each computer an access right indicating whether each file/directory possessed by the computer is to be accessible by each other computer/user of the network, such that the visible/hidden setting is specified along with the access right, and an access from a requesting computer/user to the computer is controlled according to the access right.

* * * * *